United States Patent
Saito et al.

(10) Patent No.: US 8,048,564 B2
(45) Date of Patent: Nov. 1, 2011

(54) NONAQUEOUS ELECTROLYTE SECONDARY BATTERY AND METHOD OF FORMING POSITIVE ELECTRODE

(75) Inventors: Motoharu Saito, Hyogo (JP); Masahisa Fujimoto, Osaka (JP); Katsutoshi Takeda, Tokushima (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 118 days.

(21) Appl. No.: 12/665,129

(22) PCT Filed: Jun. 25, 2008

(86) PCT No.: PCT/JP2008/001654
§ 371 (c)(1),
(2), (4) Date: Dec. 17, 2009

(87) PCT Pub. No.: WO2009/001557
PCT Pub. Date: Dec. 31, 2008

(65) Prior Publication Data
US 2010/0173202 A1    Jul. 8, 2010

(30) Foreign Application Priority Data

Jun. 25, 2007  (JP) ................................ 2007-166850
Jun. 24, 2008  (JP) ................................ 2008-164023

(51) Int. Cl.
*H01M 4/58* (2010.01)
*B05D 5/12* (2006.01)

(52) U.S. Cl. .................... 429/218.1; 429/224; 427/126.3

(58) Field of Classification Search ............... 429/218.1, 429/224; 427/126.3
See application file for complete search history.

(56) References Cited

U.S. PATENT DOCUMENTS

| | | | |
|---|---|---|---|
| 6,306,542 B1 | 10/2001 | Nakano | |
| 6,761,997 B2 * | 7/2004 | Munakata et al. | ......... 429/231.1 |
| 7,195,842 B1 | 3/2007 | Fujimoto et al. | ............. 429/209 |
| 7,235,330 B1 | 6/2007 | Fujimoto et al. | ............. 429/233 |
| 7,794,881 B1 | 9/2010 | Fujimoto et al. | ......... 429/231.95 |
| 2002/0098146 A1 | 7/2002 | Takada | |
| 2005/0019661 A1 | 1/2005 | Han et al. | .................. 429/231.3 |
| 2006/0257311 A1 | 11/2006 | Takada | |

FOREIGN PATENT DOCUMENTS

| | | |
|---|---|---|
| CN | 1382309 A | 11/2002 |
| CN | 1288777 C | 12/2006 |
| JP | 05074451 A * | 3/1993 |
| JP | 2000-203844 | 7/2000 |
| JP | 2002-220231 A1 | 8/2002 |
| JP | 2002-313337 A1 | 10/2002 |
| JP | 2004-262675 A1 | 9/2004 |
| JP | 2005-267940 A1 | 9/2005 |
| JP | 2008-84652 A1 | 4/2008 |
| WO | WO 2008/081839 A1 | 7/2008 |

OTHER PUBLICATIONS

A. D. Robertson, A. R. Armstrong and P. G. Bruce. Influence of ion exchange conditions on the defect chemistry and performance of cobalt doped layered lithium manganese oxide based intercalation compounds, Chem. Comm. 2000, 20, 1997-1998.*
A. D. Robertson, A. R. Armstrong and P. G. Bruce. Layered LixMn1-yCoyO2 Intercalation ElectrodesInfluence of Ion Exchange on Capacity and Structure upon Cycling, Chem. Mater. 2001, 13, 2380-2386.*
A. D. Robertson, A. R. Armstrong, A. J. Paterson, M. J. Duncan and P. G. Bruce. Nonstoichiometric layered LixMnyO2 intercalation electrodes—a multiple dopant strategy, J. Mater. Chem. 2003, 13, 2367-2373.*
D. Carlier, et al.; "Lithium Electrochemical Deintercalation from O2-LiCOO2 Structure and Physical Properties;" Journal of the Electrochemical Society; vol. 149; No. 10; 2002; A1310-A1320 (11 Sheets)/p. 1.
J.M.Paulsen, et al.; "Layered LiCoO2 with a Different Oxygen Stacking (O2 Structure) as a Cathode Material for Rechargeable Lithium Batteries;" Journal of the Electrochemical Society; vol. 147; No. 2; 2000; pp. 508-516 (9 Sheets.)/p. 1.
Z. Lu, et al.; The Effect of Co Substitution for Ni on the Structure and Electrochemical Behavior of T2 and O2 Structure Li2/3[CoxNi1/3-xMn2/3]O2; Journal of the Electrochemical Society; vol. 148; No. 3; 2001; A237-A240 (4 Sheets.)/p. 1.
A. Kajiyama, et al.; "Synthesis and electrochemical properties of LixCo0.5Mn0.5O2;" Solid State Ionics; vol. 149; 2002; pp. 39-45 (7 Sheets.)/p. 1.
International Search Report for International Application No. PCT/JP2008/001654 dated Sep. 22, 2008.
Office Action dated Aug. 5, 2011 issued in counterpart Chinese application No. 200880022049.X with English translation.

* cited by examiner

*Primary Examiner* — Jerry A Lorengo
*Assistant Examiner* — Carlos Barcena
(74) *Attorney, Agent, or Firm* — Kratz, Quintos & Hanson, LLP

(57) ABSTRACT

A positive electrode active material is formed of a lithium containing layered oxide. The lithium containing layered oxide contains either or both of $Li_ANa_BMn_xCo_yO_{2\pm\alpha}$ that belongs to a space group P6₃mc or $Li_ANa_BMn_xCo_yO_{2\pm\alpha}$ that belongs to a space group Cmca. The lithium containing layered oxide contains the $Li_ANa_BMn_xCo_yO_{2\pm\alpha}$ as a solid solution, a mixture or both of them. In the $Li_ANa_BMn_xCo_yO_{2\pm\alpha}$, $0.5 \leq A \leq 1.2$, $0 < B \leq 0.01$, $0.40 \leq x \leq 0.55$, $0.40 \leq y \leq 0.55$, $0.80 \leq x+y \leq 1.10$ and $0 \leq \alpha \leq 0.3$.

6 Claims, 18 Drawing Sheets

F I G. 1
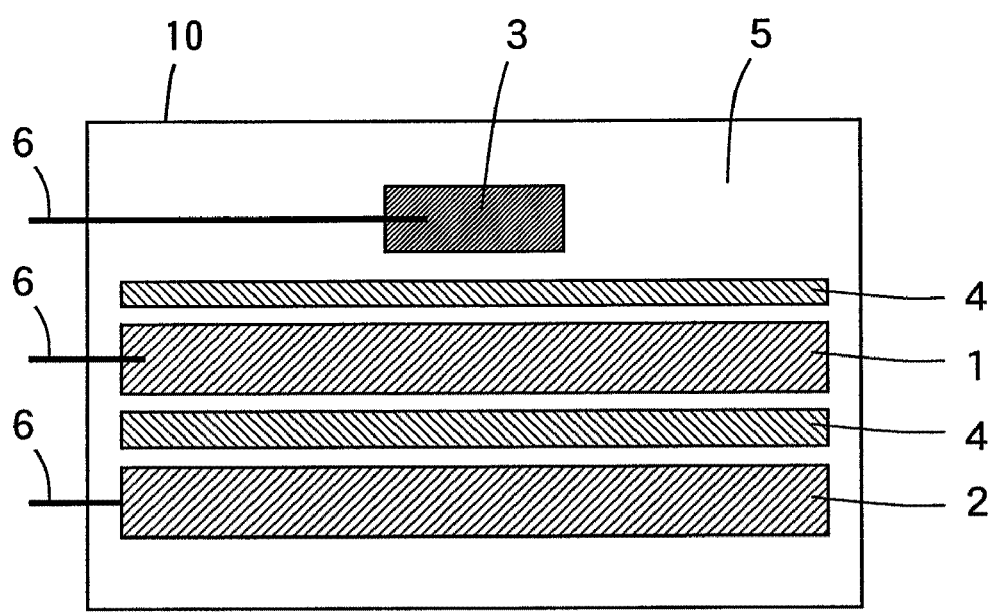

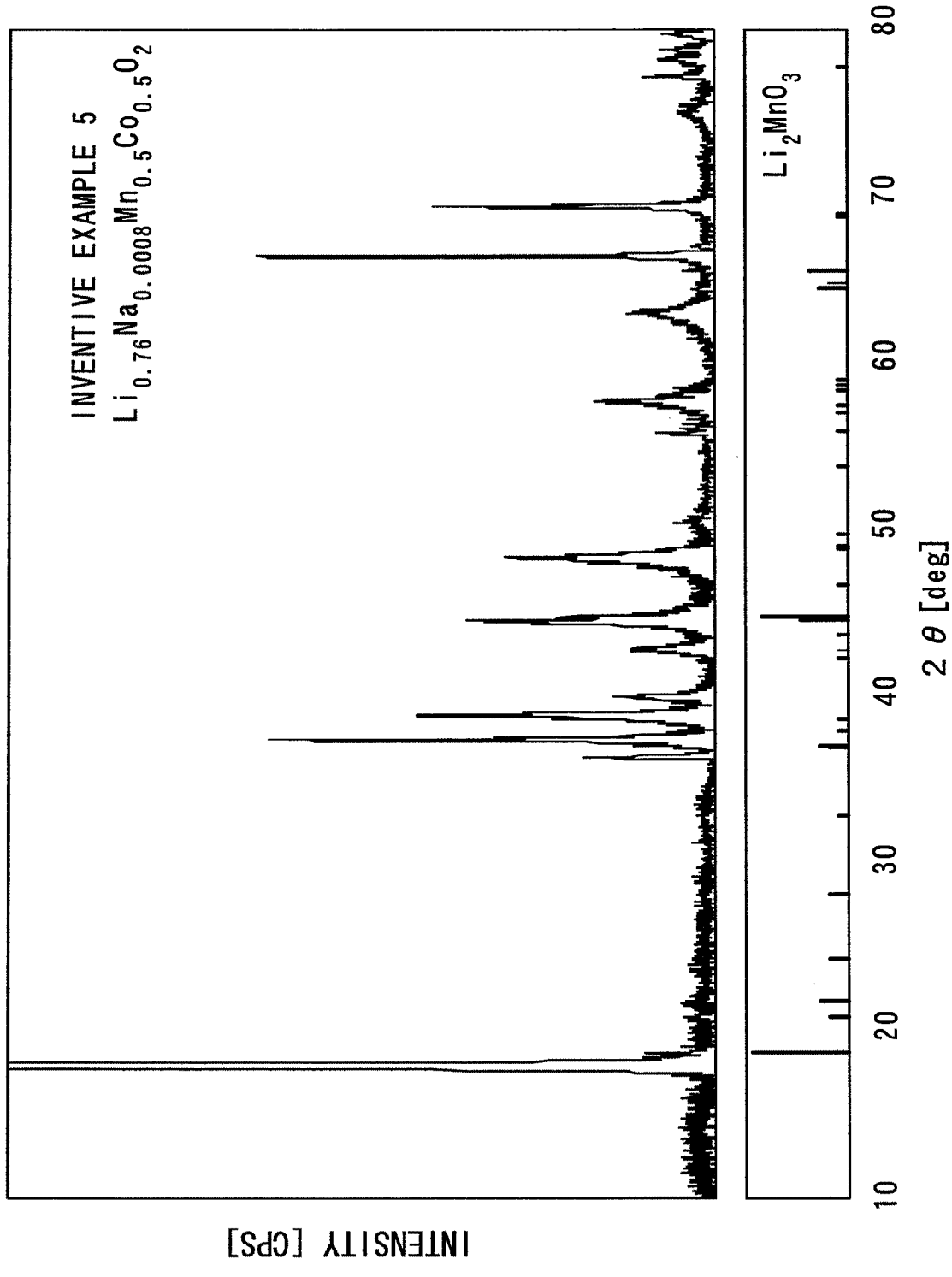
F I G. 5

NONAQUEOUS ELECTROLYTE SECONDARY BATTERY AND METHOD OF FORMING POSITIVE ELECTRODE

TECHNICAL FIELD

The present invention relates to a nonaqueous electrolyte secondary battery including a positive electrode that contains a positive electrode active material, a negative electrode and a nonaqueous electrolyte.

BACKGROUND ART

Nonaqueous lithium ion secondary batteries using nonaqueous electrolytes are utilized today as secondary batteries with high energy density. In a nonaqueous lithium ion secondary battery, transfer of lithium ions between a positive electrode and a negative electrode causes charges and discharges.

A lithium transition metal composite oxide such as lithium-cobalt oxide ($LiCoO_2$) having a layered structure is employed as the positive electrode, a carbon material capable of storing and releasing lithium, for example, is employed as the negative electrode, and a nonaqueous electrolyte produced by dissolving lithium salt such as lithium tetrafluoroborate ($LiBF_4$) or lithium hexafluorophosphate ($LiPF_6$) in an organic solvent such as ethylene carbonate or diethyl carbonate is used in such a nonaqueous lithium ion secondary battery.

Such nonaqueous lithium ion secondary batteries have recently been used as power supplies for various types of mobile equipment. With increasing power consumption due to expansion in functionality of the mobile equipment, however, it is desired that nonaqueous lithium ion secondary batteries have higher energy density.

Increased capacity of positive electrode materials is required to obtain nonaqueous lithium ion secondary batteries with high energy density. In particular, expectations for layered compounds are rising. Studies have so far been made on many kinds of lithium containing layered compounds, resulting in development of materials such as $LiCoO_2$, $LiNiO_2$ and $LiNi_{1/3}Co_{1/3}Mn_{1/3}O_2$.

A method of synthesizing a lithium containing layered compound via a sodium containing layered compound has been studied as a new method of synthesizing a lithium containing layered compound. According to the method, a lithium containing layered compound, which is difficult to be synthesized, can be easily obtained. For example, ion exchange of sodium for lithium allows $Na_xCo_{0.5}Mn_{0.5}O_2$ to be utilized as a positive electrode active material for a lithium ion secondary battery.

[Patent Document 1] JP 2002-220231 A
[Nonpatent Document 1] J. Electrochem. Soc, 149(10)(2002) A1310
[Nonpatent Document 2] J. Electrochem. Soc, 147(2)(2000) 508
[Nonpatent Document 3] J. Electrochem. Soc, 148(3)(2001) 237
[Nonpatent Document 4] Solid State Ionics 149 (2002) P39

DISCLOSURE OF THE INVENTION

Problems to be Solved by the Invention

When lithium is extracted from $LiCoO_2$ that is currently used for the positive electrode of the nonaqueous lithium ion secondary battery by the composition ratio of 0.5 or more (x=0.5 or more in $Li_{1-x}CoO_2$), such problems as decomposition of the crystal structure and decrease in reversibility may arise. Therefore, a charge cutoff potential has to be limited to about 4.3 V (vs. $Li/Li^+$) and a discharge capacity density is about 160 mAh/g in conventional nonaqueous lithium ion secondary batteries using $LiCoO_2$ as the positive electrode material.

If the conventional nonaqueous lithium ion secondary battery is repeatedly charged and discharged until 5.0 V (vs. $Li/Li^+$), the discharge capacity density is significantly decreased.

The discharge capacity density of $Li_xCo_{0.5}Mn_{0.5}O_2$ having an O3 structure that is obtained through ion exchange of sodium in $Na_xCo_{0.5}Mn_{0.5}O_2$ for lithium is as low as about 130 mAh/g.

Therefore, there is required such a positive electrode material that has a stable crystal structure, high discharge capacity density and a good cycle performance even though it is charged to a high potential to cause a significant amount of lithium to be extracted from a positive electrode active material.

An object of the present invention is to provide a nonaqueous electrolyte secondary battery having high capacity and good cycle performance and a method of forming a positive electrode.

Means for Solving the Problems (1) According to an aspect of the present invention, a nonaqueous electrolyte secondary battery includes a positive electrode containing a positive electrode active material composed of a lithium containing oxide, a negative electrode and a nonaqueous electrolyte, wherein the lithium containing oxide contains $Li_ANa_BMn_xCo_yO_{2\pm\alpha}$ ($0.5 \leq A \leq 1.2$, $0 < B \leq 0.01$, $0.40 \leq x \leq 0.55$, $0.40 \leq y \leq 0.55$, $0.80 \leq x+y \leq 1.10$ and $0 \leq \alpha \leq 0.3$) that belongs to a space group $P6_3mc$ and/or a space group Cmca.

In the nonaqueous electrolyte secondary battery, the lithium containing oxide containing the $Li_ANa_BMn_xCo_yO_{2\pm\alpha}$ ($0.5 \leq A \leq 1.2$, $0 < B \leq 0.01$, $0.40 \leq x \leq 0.55$, $0.40 \leq y \leq 0.55$, $0.80 \leq x+y \leq 1.10$ and $0 \leq \alpha \leq 0.3$) that belongs to the space group $P6_3mc$ and/or the space group Cmca is used as the positive electrode active material.

In this case, the crystal structure of the positive electrode active material is unlikely to be decomposed even though the positive electrode active material is charged to a high potential to cause a large amount of lithium to be extracted. This causes high charge-discharge capacity density to be obtained. In addition, repeating charges to the high potential and discharges does not decrease a charge-discharge capacity density. Accordingly, the nonaqueous electrolyte secondary battery having high capacity and good cycle performance is achieved.

(2) The lithium containing oxide may contain a substance whose diffraction angle 2θ has a peak in a range from 18.0 degrees to 19.5 degrees in an X-ray powder crystal diffraction spectrum using $CuK_\alpha$ as an X-ray source and which belongs to a space group C2/m or a space group C2/c as a solid solution, a mixture or both of the solid solution and the mixture. In this case, the high charge-discharge capacity density can be obtained.

(3) The substance whose diffraction angle 2θ has the peak in the range from 18.0 degrees to 19.5 degrees may be $Li_{1+x}[Mn_yCo_{1-y}]_{1-x}O_2$ ($0 \leq x \leq 1/3$ and $0 < y \leq 1$). In this case, the high charge-discharge capacity density can be obtained while a basic frame of the lithium containing oxide can be sufficiently maintained.

(4) A real density of the lithium containing oxide may not be less than 4.4 g/cm³. In this case, the sufficiently high charge-discharge capacity density can be obtained.

(5) The negative electrode may contain at least one selected from a group composed of lithium metal, silicon, carbon, tin, germanium, aluminum, lead, indium, gallium, a lithium containing alloy, a carbon material in which lithium is previously stored, and a silicon material in which lithium is previously stored.

The negative electrode composed of such a material is used, so that charges and discharges can be sufficiently performed in the nonaqueous electrolyte secondary battery.

Note that the lithium containing oxide preferably has the foregoing substance whose diffraction angle 2θ has the peak in the range from 18.0 degrees to 19.5 degrees with a less than 35 mol % content. In this case, the high charge-discharge capacity density can be obtained while the basic frame of the lithium containing oxide can be sufficiently maintained.

(6) According to another aspect of the present invention, a method of fabricating a positive electrode includes forming a positive electrode active material composed of a lithium containing oxide that contains sodium by subjecting part of sodium contained in a sodium containing oxide to ion exchange for lithium, wherein the sodium containing oxide contains $Na_A Li_B MO_{2\pm\alpha}$ ($0.5 \leq A \leq 1.1$, $0 < B \leq 0.3$ and $0 \leq \alpha \leq 0.3$), and the M includes at least one of manganese and cobalt, and the sodium containing oxide contains a substance whose diffraction angle 2θ has a peak in a range from 18.0 degrees to 19.5 degrees in an X-ray powder crystal diffraction spectrum using $CuK_\alpha$ as an X-ray source and which belongs to a space group C2/m or a space group C2/c.

According to the fabricating method, the ion exchange of part of the sodium in the sodium containing oxide $Na_A Li_B MO_{2\pm\alpha}$ ($0.5 \leq A \leq 1.1$, $0 < B \leq 0.3$ and $0 \leq \alpha \leq 0.3$) for the lithium is performed, thus producing the positive electrode active material composed of the lithium containing oxide that contains sodium.

In the positive electrode containing the positive electrode active material, the crystal structure is unlikely to be decomposed even though the positive electrode active material is charged to a high potential to cause a large amount of lithium to be extracted. This causes high charge-discharge capacity density to be obtained. In addition, repeating charges to the high potential and discharges does not decrease the charge-discharge capacity density. Accordingly, the nonaqueous electrolyte secondary battery having high capacity and good cycle performance is achieved.

Furthermore, the high charge-discharge capacity density of the positive electrode active material can be obtained according to this method.

Note that the sodium containing oxide preferably has the $Li_{1+x}[Mn_y Co_{1-y}]_{1-x} O_2$ ($0 \leq x \leq 1/3$ and $0 < y \leq 1$) with a less than 35 mol % content. In this case, the high charge-discharge capacity density can be obtained while the basic frame of the positive electrode active material can be sufficiently maintained.

Effects of the Invention

According to the present invention, the crystal structure of the positive electrode active material is unlikely to be decomposed even though the positive electrode active material is charged to the high potential to cause the large amount of lithium to be extracted. This causes high charge-discharge capacity density to be obtained. In addition, repeating charges to the high potential and discharges does not decrease the charge-discharge capacity density. Accordingly, the nonaqueous electrolyte secondary battery having high capacity and good cycle performance is achieved.

BRIEF DESCRIPTION OF THE DRAWINGS

FIG. 1 A schematic explanatory view of a test cell of a nonaqueous electrolyte secondary battery FIG. 2 A graph showing a result of XRD measurement of a positive electrode active material of an inventive example 1

FIG. 5 A graph showing a result of the XRD measurement of a positive electrode active material of an inventive example 5

BEST MODE FOR CARRYING OUT THE INVENTION

Figure 2:
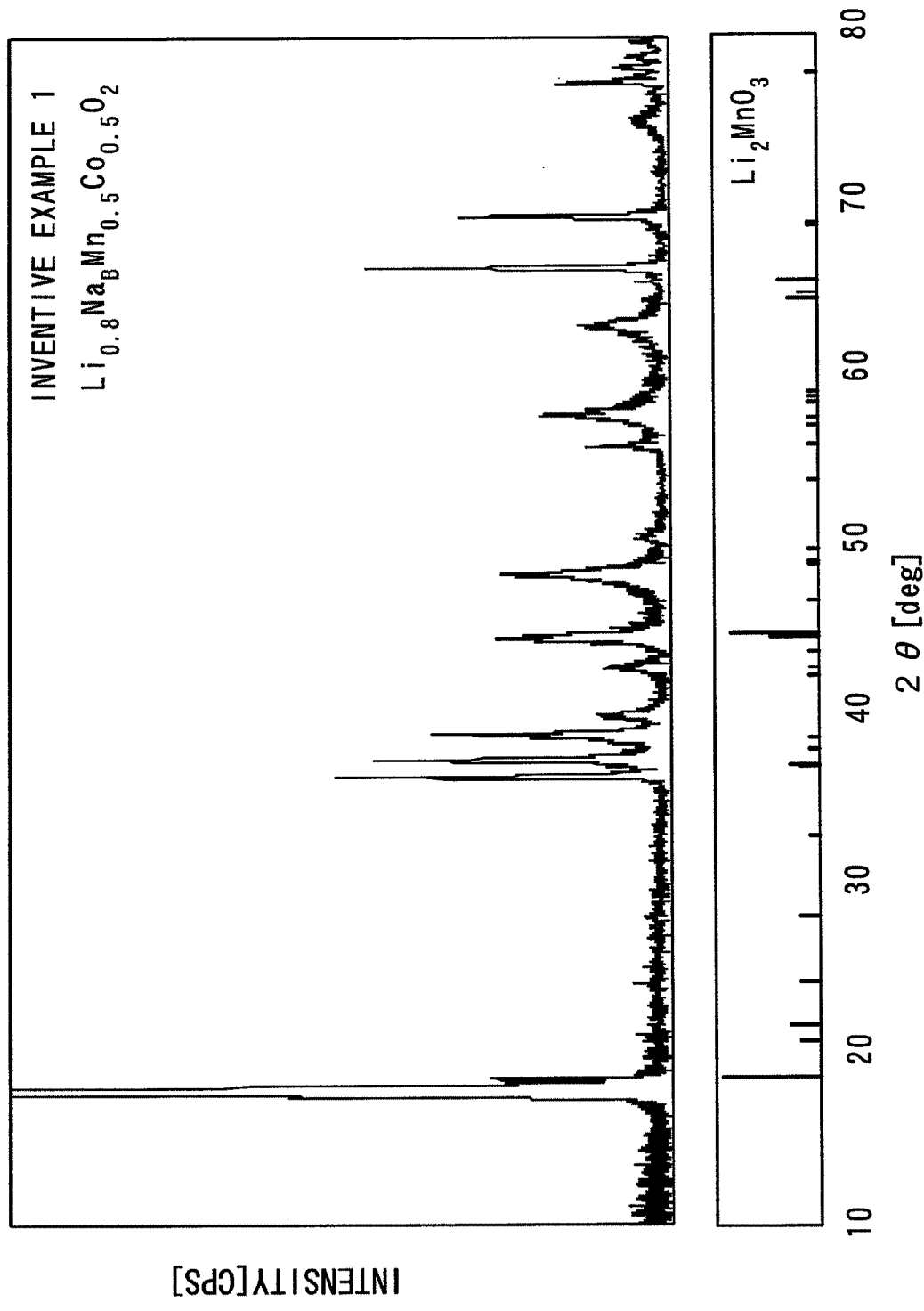
Figure 3:
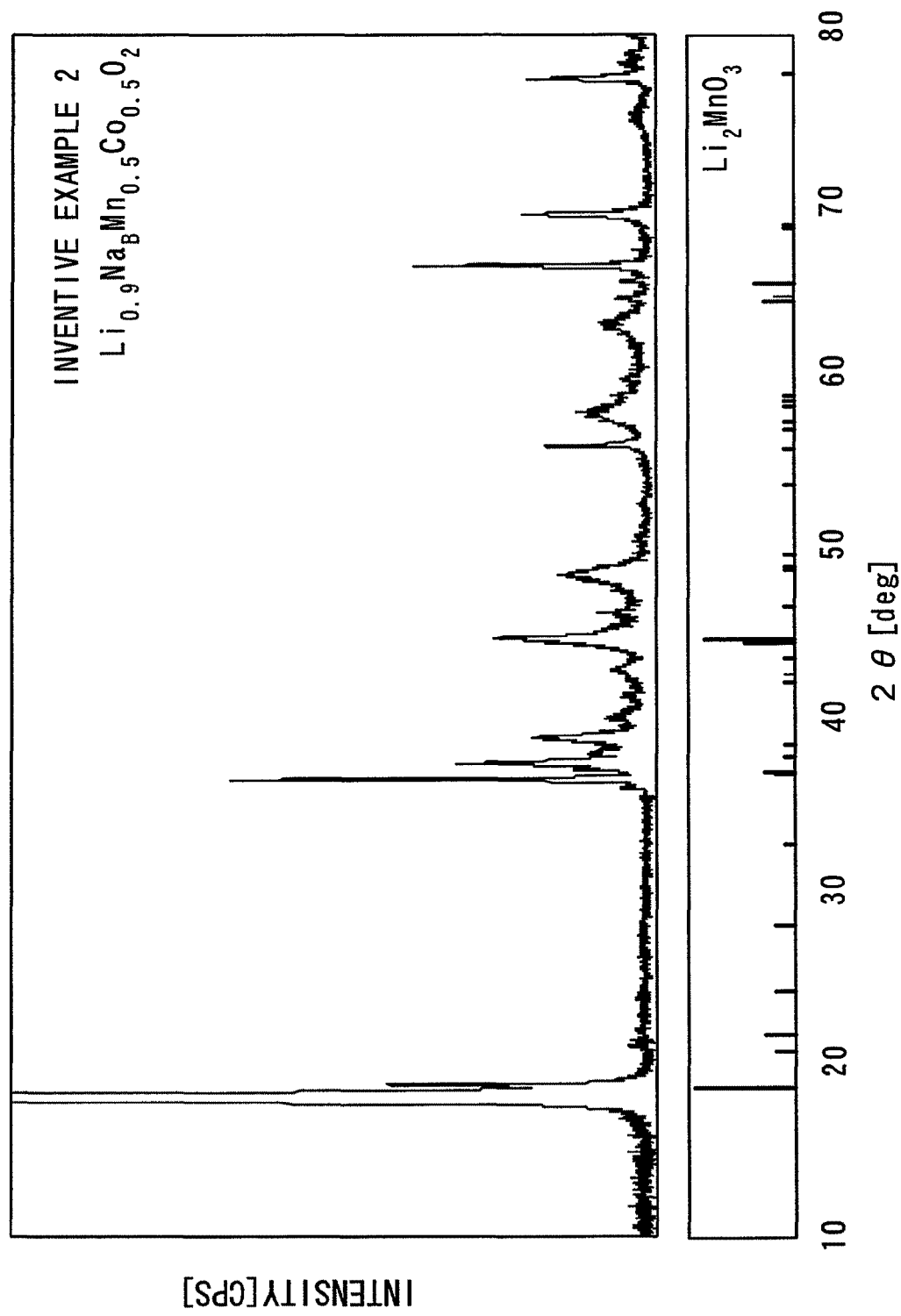
FIG. 3 A graph showing a result of the XRD measurement of a positive electrode active material of an inventive example 2
Figure 4:
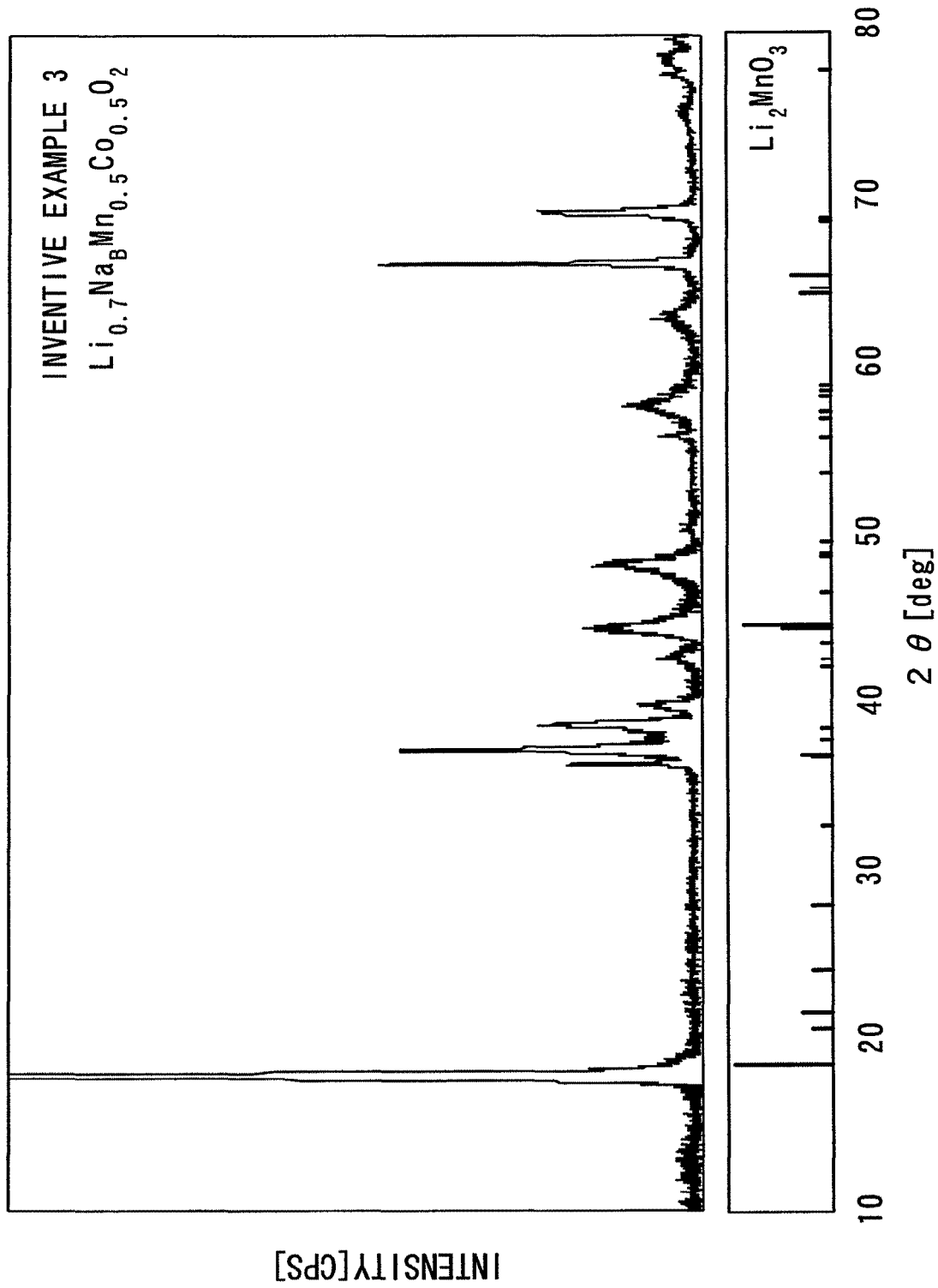
FIG. 4 A graph showing a result of the XRD measurement of a positive electrode active material of an inventive example 3
Figure 6:
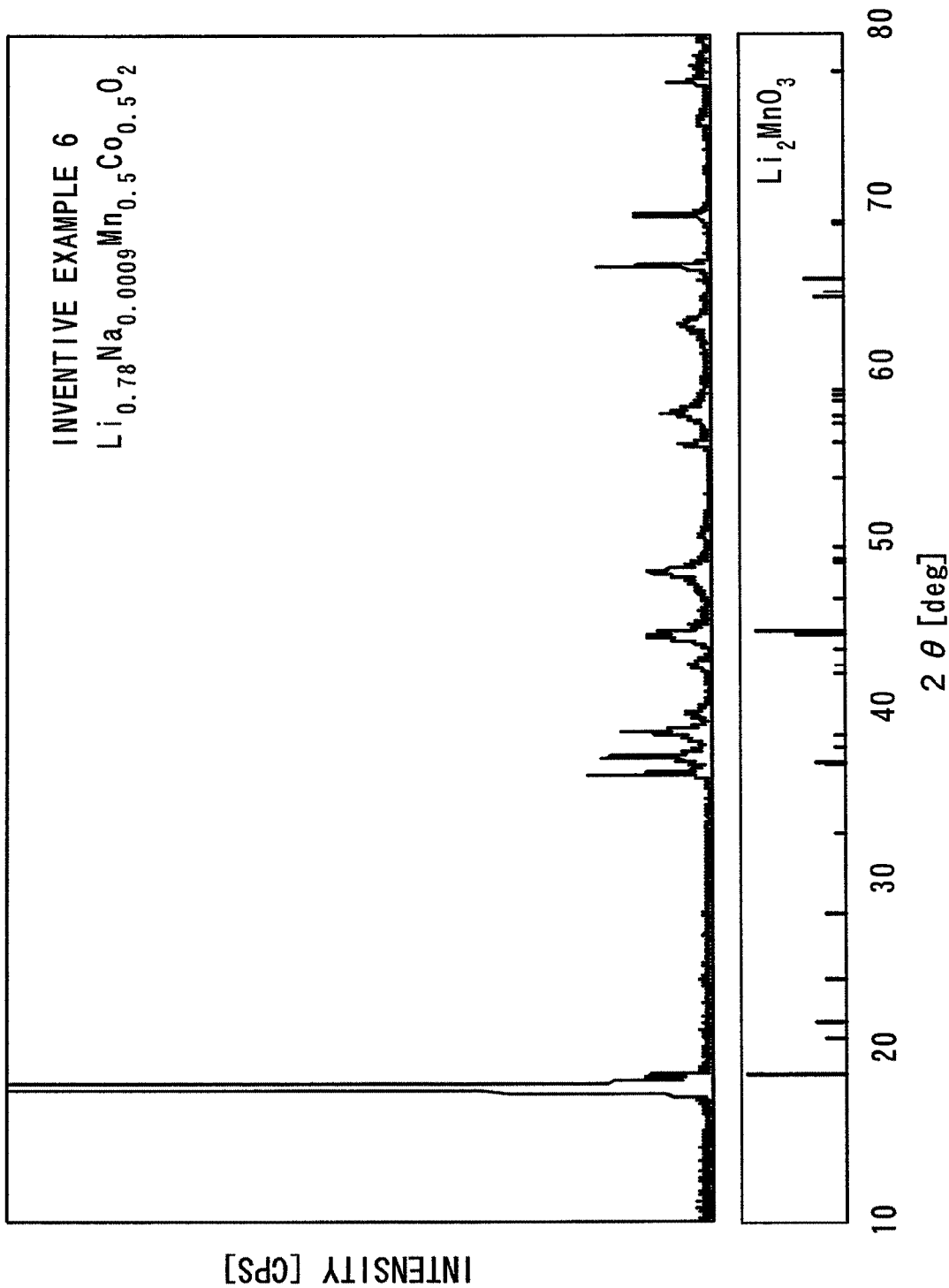
FIG. 6 A graph showing a result of the XRD measurement of a positive electrode active material of an inventive example 6
Figure 7:
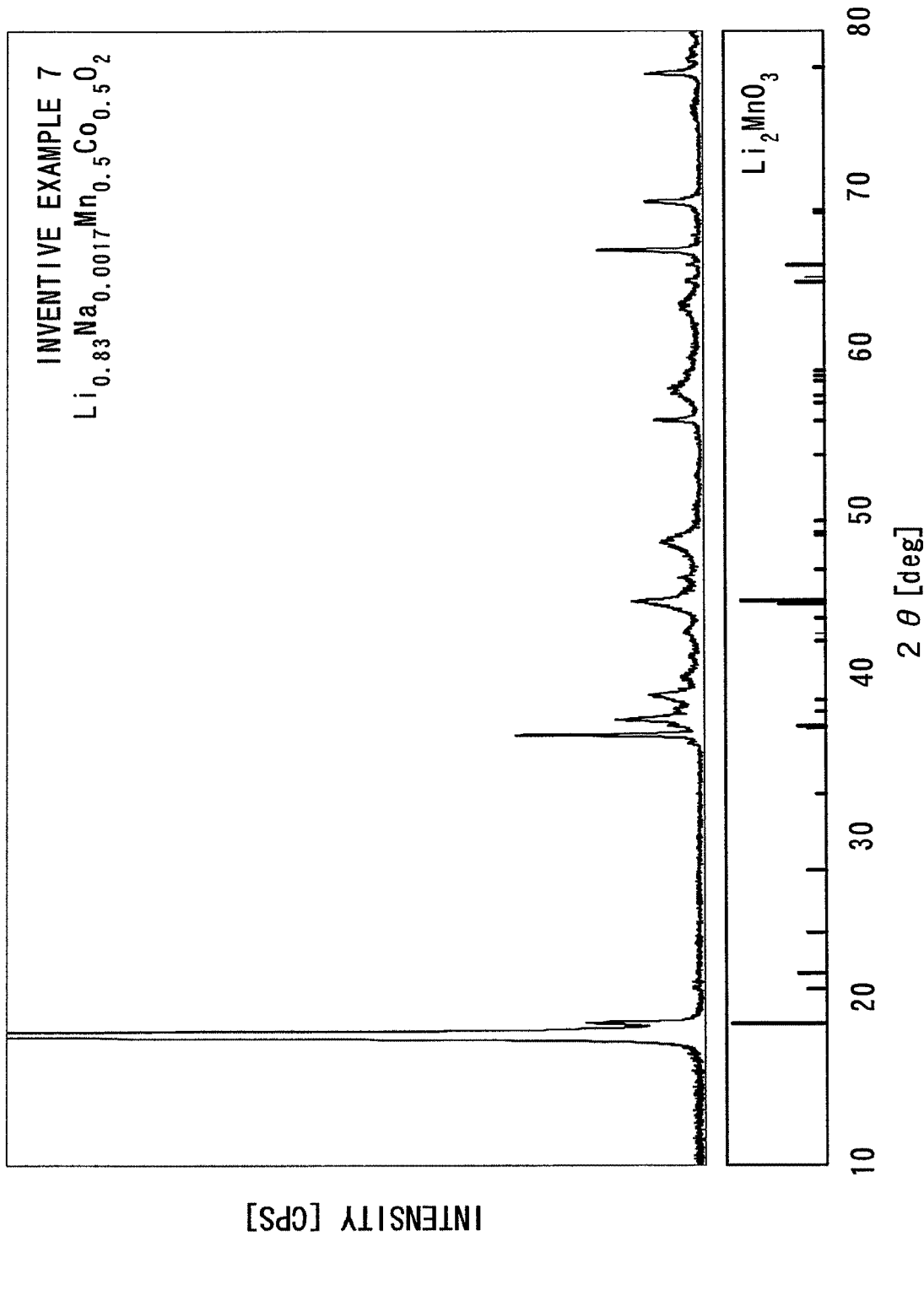
FIG. 7 A graph showing a result of the XRD measurement of a positive electrode active material of an inventive example 7
Figure 8:
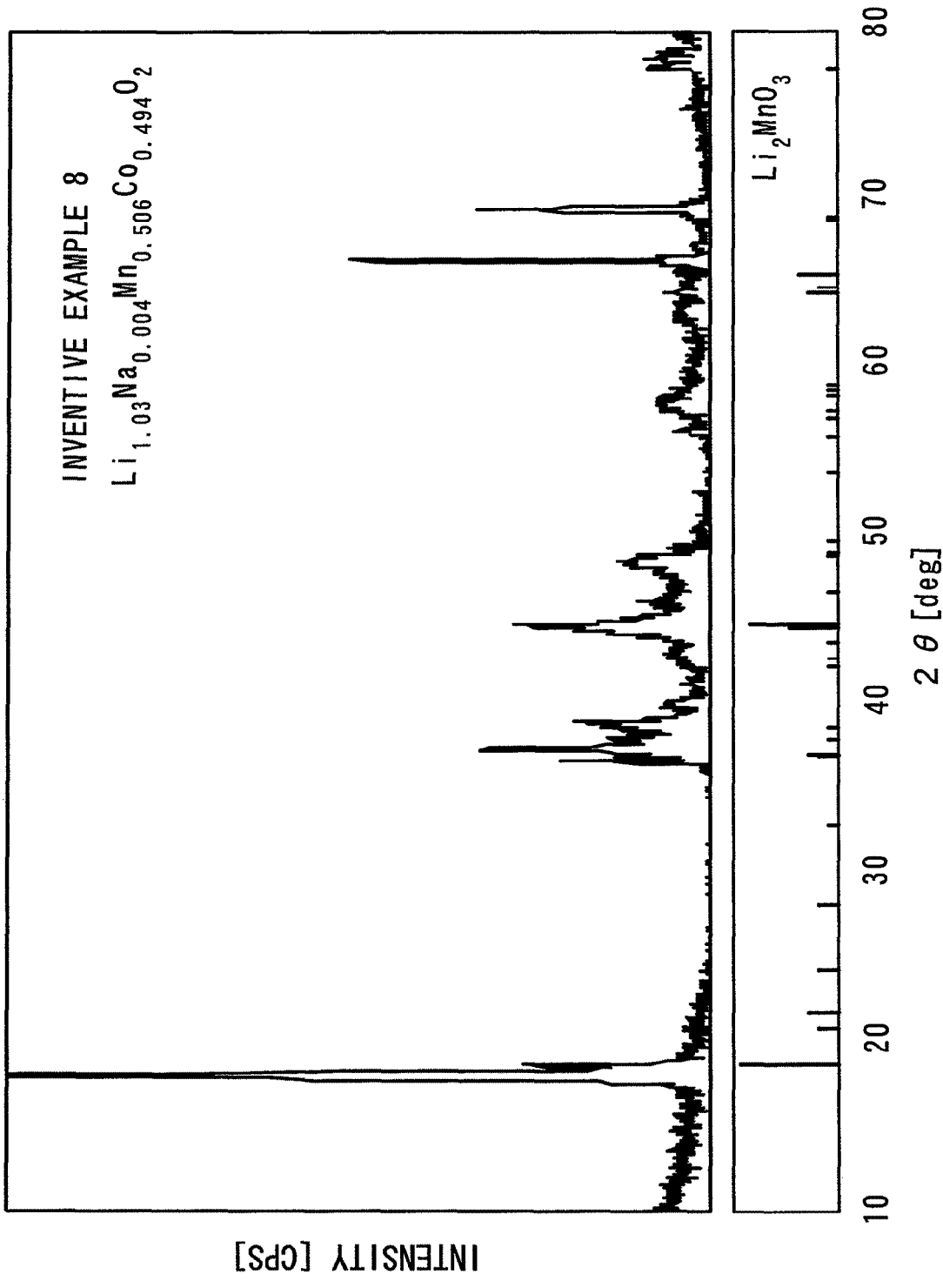
FIG. 8 A graph showing a result of the XRD measurement of a positive electrode active material of an inventive example 8
Figure 9:
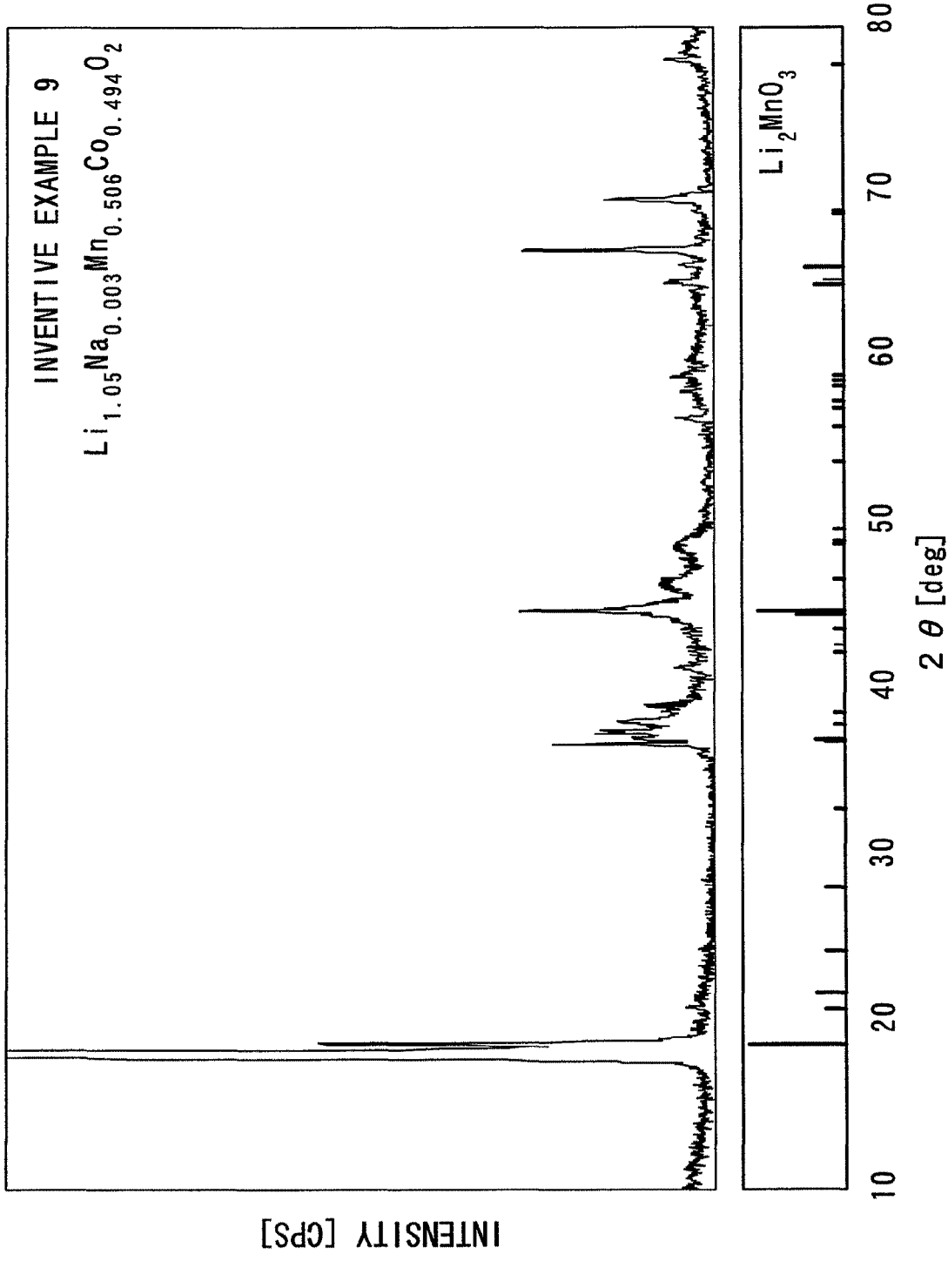
FIG. 9 A graph showing a result of the XRD measurement of a positive electrode active material of an inventive example 9

The embodiments of the present invention will be described in detail referring to the drawings. The embodiments below describe a nonaqueous electrolyte secondary battery.

The nonaqueous electrolyte secondary battery according to the present embodiment is composed of a positive electrode, a negative electrode and a nonaqueous electrolyte, and transfer of lithium ions between the positive electrode and the negative electrode causes charges and discharges.

(1) Positive Electrode

(1-1) Positive Electrode Active Material

A positive electrode active material is composed of a lithium containing layered oxide. The lithium containing layered oxide contains either or both of $Li_ANa_BMn_xCo_yO_{2\pm\alpha}$ that has an O2 structure and belongs to a space group $P6_3mc$ and $Li_ANa_BMn_xCo_yO_{2\pm\alpha}$ that has a T2 ($T^\#2$) structure and belongs to a space group Cmca. The lithium containing layered oxide contains the $Li_ANa_BMn_xCo_yO_{2\pm\alpha}$ as a solid solution, a mixture or both of them.

In the $Li_ANa_BMn_xCo_yO_{2\pm\alpha}$, $0.5 \leq A \leq 1.2$, $0 < B \leq 0.01$, $0.40 \leq x \leq 0.55$, $0.40 \leq y \leq 0.55$, $0.80 \leq x+y \leq 1.10$ and $0 \leq \alpha \leq 0.3$, and preferably $0.7 \leq A \leq 1.2$, $0 < B \leq 0.005$, $0.40 \leq x \leq 0.525$, $0.40 \leq y \leq 0.525$, $0.80 \leq x+y \leq 1.05$ and $0 \leq \alpha \leq 0.3$.

The foregoing lithium containing layered oxide preferably contains a substance whose diffraction angle 2θ has a main peak in a range from 18.0° to 19.5° in X-ray powder crystal diffraction measurement using $CuK_\alpha$ as a solid solution, a mixture or both of them. It is considered that such a substance is $Li_{1+x}[Mn_yCo_{1-y}]_{1-x}O_2$ that belongs to a space group C2/m or C2/c.

In the $Li_{1+x}[Mn_yCo_{1-y}]_{1-x}O_2$, $0 \leq x \leq 1/3$, $0 < y \leq 1$. Examples of $Li_{1+x}[Mn_yCo_{1-y}]_{1-x}O_2$ include $Li_2MnO_3$ (when x=1/3, y=1). In this case, the basic frame of the lithium containing layered oxide can be maintained while high charge-discharge capacity density can be obtained.

Note that the foregoing solid solution is considered to be an interstitial solid solution or a substitutional solid solution. The foregoing mixture is considered to be obtained by not only mixture at a particle level but also mixture or binding at a crystallite level.

The ratio of the substance belonging to the space group C2/m or C2/c that is contained in the lithium containing layered oxide is preferably less than 35 mol %, more preferably less than 30 mol %, and still more preferably less than 25 mol %. In this case, the basic frame of the lithium containing layered oxide can be sufficiently maintained while the high charge-discharge capacity density can be obtained.

In the lithium containing layered oxide having the foregoing characteristics, a value obtained by dividing an initial charge capacity by an initial discharge capacity (initial charge-discharge efficiency) is not less than 100% and not more than 200%, for example.

(1-2) Formation of the Positive Electrode Active Material

The foregoing lithium containing layered oxide is obtained through ion exchange of sodium in a sodium containing layered oxide for lithium using an aqueous solution, a nonaqueous solution or solvent salt. The sodium containing layered oxide contains $Na_ALi_BMO_{2\pm\alpha}$, where the M includes at least one of manganese (Mn) and cobalt (Co). In addition, $0.5 \leq A \leq 1.1$, $0 < B \leq 0$ and $0 \leq \alpha \leq 0.3$ in the $Na_ALi_BMO_{2\pm\alpha}$. Examples of the sodium containing layered oxide $Na_ALi_BMO_{2\pm\alpha}$ include $Na_{0.7}Li_{0.2}M_{0.5}Co_{0.5}O_2$.

In the present embodiment, the sodium containing layered oxide is added to a mixture of lithium nitrate and lithium chloride to be held with a temperature of less than 320° C. for a predetermined period of time, so that ion exchange is performed.

The sodium containing layered oxide preferably contains the substance whose diffraction angle 2θ has the main peak in the range from 18.0° to 19.5° in the X-ray powder crystal diffraction measurement using $CuK_\alpha$, as a solid solution, a mixture or both of them. It is considered that such a substance is $Li_{1+x}[Mn_yCo_{1-y}]_{1-x}O_2$ that belongs to the space group C2/m or C2/c.

In the $Li_{1+x}[Mn_yCo_{1-y}]_{1-x}O_2$, $0 \leq x \leq 1/3$, $0 < y \leq 1$. Examples of the $Li_{1+x}[Mn_yCo_{1-y}]_{1-x}O_2$ include $Li_2MnO_3$ (when x=1/3, y=1). The ratio of oxide belonging to the space group C2/m or C2/c that is contained in the sodium containing layered oxide is preferably less than 35 mol %.

Note that the solid solution is considered to be an interstitial solid solution or a substitutional solid solution. The mixture is considered to be obtained by not only mixture at a particle level but also mixture or binding at a crystallite level.

When the lithium containing layered oxide is formed in the foregoing manner, a real density of the lithium containing layered oxide can be 4.40 g/cm³ to 5.00 g/cm³. In this case, the real density of the lithium containing layered oxide can be higher than a real density (about 4.3 g/cm³) of the sodium containing layered oxide before the ion exchange.

Note that an amount of the $Li_2MnO_3$ in the lithium containing layered oxide $Li_ANa_BMn_xCo_yO_{2\pm\alpha}$ is found to be 29 mol % from calculation based on the composition ratio of $Na_{0.7}Li_{0.2}Mn_{0.5}Co_{0.5}O_2$ in the formation of the lithium containing layered oxide $Li_ANa_BMn_xCo_yO_{2\pm\alpha}$ from the sodium containing layered oxide $Na_{0.7}Li_{0.2}Mn_{0.5}Co_{0.5}O_2$.

Here, although the sodium containing layered oxide $Na_ALi_BMO_{2\pm\alpha}$ is synthesized by mixing and firing (in an atmosphere at about 800 to 1000° C.) a plurality of starting materials such as sodium carbonate ($NaCO_3$) and lithium carbonate ($Li_2CO_3$), sodium whose boiling point is 881° C. may sublime at the time of firing.

Therefore, even though the starting materials are mixed at a theoretical molar ratio at which the sodium containing layered oxide $Na_{0.7}Li_{0.2}Mn_{0.5}Co_{0.5}O_2$ is obtained, for example, the composition ratio of sodium in the sodium containing layered oxide to be obtained may actually be about 0.65 because of a decrease of sodium by sublimation. This is actually tested by the inventors through experiments.

In the foregoing starting materials, the amount of inorganic lithium salt such as lithium carbonate ($Li_2CO_3$) is small. Therefore, the amount of the inorganic lithium salt may exceed a theoretical value due to a weighing error at the time of mixing another starting material and the inorganic lithium salt. Lithium that is a light metal and has a high boiling point (1347° C.) is unlikely to sublime even in firing. Therefore, when each of the starting materials is mixed in order to provide the sodium containing layered oxide $Na_{0.7}Li_{0.2}Mn_{0.5}Co_{0.5}O_2$, for example, the composition ratio of lithium in the sodium containing layered oxide to be obtained is about 0.23 in some cases because of a weighing error of the lithium salt.

In the formation of the lithium containing layered oxide $Li_ANa_BMn_xCo_yO_{2\pm\alpha}$ from the sodium containing layered oxide $Na_ALi_BMO_{2\pm\alpha}$, such increase and decrease in the composition ratios of sodium and lithium may cause the amount of $Li_2MnO_3$ contained in the lithium containing layered oxide $Li_ANa_BMn_xCo_yO_{2\pm\alpha}$ to be obtained to exceed the theoretical value in some cases.

The inventors consider that the ratio of the substance ($Li_2MnO_3$, for example) belonging to the space group C2/m or C2/c that is contained in the lithium containing layered oxide $Li_ANa_BMn_xCo_yO_{2\pm\alpha}$ is preferably less than 35 mol %.

(1-3) Conductive Agent and Binder

A conductive agent may be added in formation of the positive electrode containing the positive electrode active material. When the positive electrode active material has electrical conductivity, addition of the conductive agent further improves the electrical conductivity, resulting in good charge-discharge performance. When the positive electrode active material has low electrical conductivity, the use of the conductive agent allows the positive electrode active material to reliably function as the positive electrode.

The conductive agent may be any conductive material, and at least one of oxide, carbide, nitride, and a carbon material that have excellent electrical conductivity can be employed. Examples of the oxide may include tin oxide and indium oxide. Examples of the carbide may include tungsten carbide and zirconium carbide. Examples of the nitride may include titanium nitride and tantalum nitride.

Note that when such a conductive agent is added as described above, the small amount of added conductive agent makes it difficult to sufficiently improve the electrical conductivity of the positive electrode, while the excessive amount of added conductive agent reduces the ratio of the positive electrode active material contained in the positive electrode and therefore high energy density cannot be obtained. Therefore, the amount of the conductive agent to be added falls within a range from 0% to 30% by weight of the entire positive electrode, preferably within a range from 0% to 20% by weight, and more preferably within a range from 0% to 10% by weight.

Examples of a binder to be added to the positive electrode may include at least one of polytetrafluoroethylene, polyvinylidene fluoride, polyethylene oxide, polyvinyl acetate, polymethacrylate, polyacrylate, polyacrylonitrile, polyvinyl alcohol, styrene-butadiene rubber, and carboxymethylcellulose.

If the amount of the binder to be added to the positive electrode is excessive, the ratio of the positive electrode active material contained in the positive electrode is reduced, and therefore high energy density cannot be obtained. Thus, the amount of the binder falls within a range from 0% to 30% by weight, preferably within a range from 0% to 20% by weight, more preferably within a range from 0% to 10% by weight.

(2) Nonaqueous Electrolyte

The nonaqueous electrolyte that includes an electrolytic salt dissolved in a nonaqueous solvent can be used.

Examples of the nonaqueous solvent may include a cyclic carbonate, a chain carbonate, esters, cyclic ethers, chain ethers, nitriles, amides, and a combination thereof.

Examples of the cyclic carbonate may include ethylene carbonate, propylene carbonate, butylene carbonate, and any of the above having its hydrogen group partly or entirely fluorinated such as trifluoropropylene carbonate and fluoroethylene carbonate.

Examples of the chain carbonate may include dimethyl carbonate, ethyl methyl carbonate, diethyl carbonate, methyl propyl carbonate, ethyl propyl carbonate, methyl isopropyl carbonate, and any of the above having its hydrogen group partly or entirely fluorinated.

Examples of the esters may include methyl acetate, ethyl acetate, propyl acetate, methyl propionate, ethyl propionate, and γ-butyrolactone. Examples of the cyclic ethers may include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ether.

Examples of the chain ethers may include 1,2-dimethoxyethane, diethyl ether, dipropyl ether, diisopropyl ether, dibutyl ether, dihexyl ether, ethyl vinyl ether, butyl vinyl ether, methylphenyl ether, ethylphenyl ether, butylphenyl ether, pentylphenyl ether, methoxytoluene, benzylethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

Examples of the nitriles may include acetonitrile, and examples of the amides may include dimethylformamide.

An electrolyte salt that is generally used in nonaqueous lithium ion secondary batteries can be used as an electrolyte salt. For example, lithium borate tetrafluoride ($LiBF_4$), lithium phosphate hexafluoride ($LiPF_6$), $LiCF_3SO_3$, $LiC_4F_9SO_3$, $LiN(CF_3SO_2)_2$, $LiN(C_2F_5SO_2)_2$, $LiAsF_6$ or difluoro(oxalato)lithium borate can be used.

One or combinations of two or more of the above-mentioned electrolyte salts may be used.

(3) The Negative Electrode

One or a plurality of lithium metal (Li), silicon (Si), carbon (C), tin (Sn), germanium (Ge), aluminum (Al), lead (Pb), indium (In), gallium (Ga), a lithium containing alloy, a carbon material in which lithium is previously stored, and a silicon material in which lithium is previously stored can be used as a negative electrode material.

(4) Fabrication of the Nonaqueous Electrolyte Secondary Battery

The nonaqueous electrolyte secondary battery is fabricated as follows using the foregoing positive electrode, negative electrode and nonaqueous electrolyte.

FIG. 1 is a schematic explanatory view of a test cell of the nonaqueous electrolyte secondary battery according to the present embodiment.

As shown in FIG. 1, under an inert atmosphere, a lead 6 is attached to the foregoing positive electrode to form a working electrode 1, and a lead 6 is attached to the negative electrode that is composed of lithium metal, for example, to form a counter electrode 2.

Next, a separator 4 is inserted between the working electrode 1 and the counter electrode 2, and then the working electrode 1, the counter electrode 2, and a reference electrode 3 that is composed of lithium metal, for example, are arranged in a laminate vessel 10. The above-described nonaqueous electrolyte 5 is injected into the laminate vessel 10 to fabricate the nonaqueous electrolyte secondary battery as the test cell. Note that a separator 4 is also inserted between the working electrode 2 and the reference electrode 3.

Note that when a charge-discharge test in a charge-discharge range of 2.5-5.0 V (vs. $Li/Li^+$) is performed to the test cell of FIG. 1 using the foregoing positive electrode active material, a capacity maintenance factor after five cycles can be 90% or more.

(5) Effects of the Present Embodiment

In the nonaqueous electrolyte secondary battery according to the present embodiment, transfer of lithium ions between the positive electrode and the negative electrode causes charges and discharges. The positive electrode active material contains either or both of the $Li_ANa_BMn_xCo_yO_{2\pm\alpha}$ ($0.5 \leq A \leq 1.2$, $0 \leq B \leq 0.01$, $0.40 \leq x \leq 0.55$, $0.40 \leq y \leq 0.55$, $0.80 \leq x+y \leq 1.10$ and $0 \leq \alpha \leq 0.3$) that belongs to the space group P6$_3$mc and the $Li_ANa_BMn_xCo_yO_{2\pm\alpha}$ ($0.5 \leq A \leq 1.2$, $0 \leq B \leq 0.01$, $0.40 \leq x \leq 0.55$, $0.40 \leq y \leq 0.55$, $0.80 \leq x+y \leq 1.10$ and $0 \leq \alpha \leq 0.3$) that belongs to the space group Cmca.

In this case, the crystal structure is unlikely to be decomposed even though a large amount of lithium is extracted because of charging to a high potential. In the $Li_A Na_B Mn_x Co_y O_{2\pm\alpha}$ having the sufficiently large composition ratio A of lithium, for example, the crystal structure can be sufficiently prevented from being decomposed even though the lithium is extracted by the composition ratio 0.85 or more. This allows the high charge-discharge capacity density to be obtained. In addition, repeating charges and discharges to the high potential does not decrease the charge-discharge capacity density. Accordingly, the nonaqueous electrolyte secondary battery having high capacity and good cycle performance is achieved.

INVENTIVE EXAMPLES

Various positive electrode active materials were formed in inventive examples and comparative examples, and each of the positive electrode active materials was examined.

(1) Inventive Examples (a) Inventive Examples 1 to 4

In each of the inventive examples 1 to 4, first, the sodium containing layered oxide (hereinafter abbreviated as the sodium oxide) was formed as a precursor for obtaining the positive electrode active material composed of the lithium containing layered oxide (hereinafter abbreviated as the lithium oxide).

Specifically, sodium oxalate ($Na_2C_2O_4$), sodium nitrate ($NaNO_3$), sodium carbonate ($NaCO_3$), lithium carbonate ($Li_2CO_3$), cobalt oxide (II III) ($Co_3O_4$), manganese oxide (III) ($Mn_2O_3$) and manganese dioxide ($MnO_2$) were used as the starting materials of the sodium oxide in the inventive examples 1 and 2. These compounds were mixed at different ratios of number of moles.

In the inventive examples 3 and 4, the compounds excluding the lithium carbonate ($Li_2CO_3$) as the foregoing starting materials of the inventive examples 1 and 2 were employed as the starting material of the sodium oxide, and these compounds were mixed at different ratios of number of moles.

Powder obtained from the mixture was molded into pellets, which were then subjected to preliminary firing for 10 hours in an air at 700° C. and main firing for 20 hours in an air at 800° C. In this manner, the sodium oxides having composition formulae shown in Table 1 were obtained. Note that the sodium oxides of the inventive examples 1 to 4 have the O2 structure that belongs to a space group $P6_3/mmc$.

of 88:12. Specifically, the ion exchange was performed by melting each of the sodium oxides of about 3 g in the foregoing mixture of 10 g, followed by holding for 10 hours with a temperature of 280° C.

Then, the mixtures and unreacted starting materials were washed with water and dried in a vacuum at 100° C. In this manner, the lithium oxides $Li_A Na_B Mn_x Co_y O_{2\pm\alpha}$ ($0.5 \leq A \leq 1.2$, $0 \leq B \leq 0.01$, $0.40 \leq x \leq 0.55$, $0.40 \leq y \leq 0.55$, $0.80 \leq x+y \leq 1.10$ and $0 \leq \alpha \leq 0.3$) that belong to the space group $P6_3mc$ or the space group Cmca and have the composition formulae shown in Table 1 were fabricated as the positive electrode active materials. Note that in Table 1, the composition ratio B of Na in the positive electrode active materials of the inventive examples 1 to 4 is larger than 0 and not more than 0.01. Particularly, the composition ratio B of Na is not more than 0.002 in the positive electrode active material of the inventive example 2. The composition ratios of the positive electrode active materials shown in Table 1 are values estimated from the foregoing fabrication conditions.

Each of the positive electrode active materials formed in the foregoing manner, acetylene black as the conductive agent and polyvinylidene fluoride as the binder were mixed at a ratio of 80% by weight, 10% by weight and 10% by weight, respectively, and dissolved in N-methyl-2-pyrrolidone, thus producing slurry as a positive electrode mixture.

Then, the produced slurry was applied on a positive electrode collector of an aluminum foil by a doctor blade method, dried, and then rolled using a roller, so that a positive electrode active material layer was formed. A collector tab of aluminum was attached to a region of the positive electrode collector where the positive electrode active material layer was not formed. Then, drying at 110° C. in a vacuum was performed, followed by molding to form the working electrode 1 (positive electrode).

Lithium metal cut in a predetermined size was used for the counter electrode 2 (negative electrode). Moreover, lithium metal was cut in a predetermined size, so that the reference electrode 3 was prepared.

A nonaqueous solvent obtained by mixing ethylene carbonate and diethyl carbonate at a volume ratio of 30:70 to which lithium phosphate hexafluoride ($LiPF_6$) as the electrolyte salt was added at a concentration of 1.0 M (molarity) was used as the nonaqueous electrolyte 5.

The test cell of the nonaqueous electrolyte secondary battery of FIG. 1 was fabricated using the foregoing working

TABLE 1

| No. | SODIUM CONTAINING LAYERED OXIDE | POSITIVE ELECTRODE ACTIVE MATERIAL | DISCHARGE CAPACITY DENSITY [mAh/g] (CHARGE-DISCHARGE RANGE 2.5-4.5 V) | DISCHARGE CAPACITY DENSITY [mAh/g] (CHARGE-DISCHARGE RANGE 2.5-5.0 V) |
|---|---|---|---|---|
| INVENTIVE EXAMPLE 1 | $Na_{0.7}Li_{0.1}Mn_{0.5}Co_{0.5}O_2$ | $Li_{0.8}Na_B Mn_{0.5}Co_{0.5}O_2$ | 146 | 203 |
| INVENTIVE EXAMPLE 2 | $Na_{0.7}Li_{0.2}Mn_{0.5}Co_{0.5}O_2$ | $Li_{0.9}Na_B Mn_{0.5}Co_{0.5}O_2$ | 158 | 220 |
| INVENTIVE EXAMPLE 3 | $Na_{0.7}Mn_{0.5}Co_{0.5}O_2$ | $Li_{0.7}Na_B Mn_{0.5}Co_{0.5}O_2$ | 123 | 176 |
| INVENTIVE EXAMPLE 4 | $Na_{0.8}Mn_{0.5}Co_{0.5}O_2$ | $Li_{0.8}Na_B Mn_{0.5}Co_{0.5}O_2$ | 139 | 179 |

The sodium oxides obtained in the foregoing manner were subjected to the ion exchange using a mixture of lithium nitrate ($LiNO_3$) and lithium chloride (LiCl) at a volume ratio electrode 1 (positive electrode), counter electrode 2 (negative electrode), reference electrode 3 and nonaqueous electrolyte 5.

Note that in the inventive example 2, the real density of the sodium oxide $Na_{0.7}Li_{0.2}Mn_{0.5}Co_{0.5}O_2$ was 4.33 g/cm³, and the real density of $Li_{0.9}N_BMn_{0.5}Co_{0.5}O_2$ after the ion exchange was 4.44 g/cm³.

(b) Inventive Examples 5 to 9

In each of the inventive examples 5 to 9, first, the sodium oxide was formed as the precursor similarly to the inventive examples 1 to 4.

Specifically, sodium carbonate ($Na_2CO_3$), lithium carbonate ($Li_2CO_3$), manganese oxide (III) ($Mn_2O_3$) and cobalt oxide (II III) ($Co_3O_4$) were used as starting materials of the sodium oxide in the inventive examples 5 and 6.

In the inventive examples 7, 8 and 9, the above-described starting materials of the inventive examples 5 and 6 including sodium nitrate ($NaNO_3$) instead of sodium carbonate ($Na_2CO_3$) were employed as starting materials.

The foregoing starting materials were crushed to be mixed using an agate mortar such that respective compositions were prepared to be $Na_{0.7}Li_{0.07}Mn_{0.5}Co_{0.5}O_2$ (the inventive example 5), $Na_{0.7}Li_{0.1}Mn_{0.5}O_{0.5}O_2$ (the inventive example 6), $Na_{0.7}Li_{0.2}Mn_{0.5}Co_{0.5}O_2$ (the inventive example 7), $Na_{1.0}Li_{0.1}Mn_{0.5}Co_{0.5}O_2$ (the inventive example 8), and $Na_{1.0}Li_{0.2}Mn_{0.5}Co_{0.5}O_2$ (the inventive example 9), and fired for 10 hours in an air at 700° C. The fired powder was again crushed to be mixed using the agate mortar, and fired for 20 hours in an air at 800° C. In this manner, the sodium oxides as the precursors were formed.

Note that the sodium oxides of the inventive examples 5 to 9 have the O2 structure that belongs to the space group $P6_3/mmc$. Table 2 shows the composition ratios of the sodium oxides of the inventive examples 5 to 9.

sion spectroscopy, and the composition ratios of manganese (Mn) and cobalt (Co) were measured by an inductively coupled plasma (ICP) method. In addition, the amounts of substances of sodium and lithium were determined such that the sum of the amounts of substances of manganese and cobalt attains one in measurement of the composition ratios.

The working electrodes 1 (positive electrodes) were obtained using the positive electrode active materials formed in the foregoing manner by the same method as that in the inventive examples 1 to 4. The test cell of the nonaqueous electrolyte secondary battery of FIG. 1 was fabricated using each working electrode 1, and the counter electrode 2 (negative electrode), the reference electrode 3 and the nonaqueous electrolyte 5 that are the same as those in the inventive examples 1 to 4.

(2) Comparative Examples (a) Comparative Example 1

In the comparative example 1, a test cell of the nonaqueous electrolyte secondary battery of FIG. 1 was fabricated using lithium cobalt oxide ($LiCoO_2$) as the positive electrode active material.

(b) Comparative Example 2

In the comparative example 2, a sodium permanganate ($NaMnO_4$) aqueous solution of 0.3 M (molarity) and a lithium chloride (LiCl) aqueous solution of 0.3 M were mixed such that an atom ratio of lithium and sodium was 1:4. The mixed solution was reacted for three days under a hydrothermal condition of 200° C. in an autoclave having an inner cylinder

TABLE 2

| No. | SODIUM CONTAINING LAYERED OXIDE | POSITIVE ELECTRODE ACTIVE MATERIAL | DISCHARGE CAPACITY DENSITY [mAh/g] (CHARGE-DISCHARGE RANGE 2.5-4.5 V) | DISCHARGE CAPACITY DENSITY [mAh/g] (CHARGE-DISCHARGE RANGE 2.5-5.0 V) |
|---|---|---|---|---|
| INVENTIVE EXAMPLE 5 | $Na_{0.7}Li_{0.07}Mn_{0.5}Co_{0.5}O_2$ | $Li_{0.76}Na_{0.0008}Mn_{0.5}Co_{0.5}O_2$ | 130 | 215 |
| INVENTIVE EXAMPLE 6 | $Na_{0.7}Li_{0.1}Mn_{0.5}Co_{0.5}O_2$ | $Li_{0.78}Na_{0.0009}Mn_{0.5}Co_{0.5}O_2$ | 140 | 213 |
| INVENTIVE EXAMPLE 7 | $Na_{0.7}Li_{0.2}Mn_{0.5}Co_{0.5}O_2$ | $Li_{0.83}Na_{0.0017}Mn_{0.5}Co_{0.5}O_2$ | 152 | 217 |
| INVENTIVE EXAMPLE 8 | $Na_{1.0}Li_{0.1}Mn_{0.5}Co_{0.5}O_2$ | $Li_{1.03}Na_{0.004}Mn_{0.506}Co_{0.494}O_2$ | 152 | 202 |
| INVENTIVE EXAMPLE 9 | $Na_{1.0}Li_{0.2}Mn_{0.5}Co_{0.5}O_2$ | $Li_{1.05}Na_{0.003}Mn_{0.506}Co_{0.494}O_2$ | 143 | 197 |

The sodium oxides formed in the foregoing manner were subjected to the ion exchange using the mixture of lithium nitrate ($LiNO_3$) and lithium chloride (LiCl) at the molar ratio of 88:12. Specifically, the ion exchange was performed by melting each of the sodium oxides of the inventive examples 5 to 9 in the foregoing mixture, followed by holding in an electric furnace for 10 hours with a temperature of 300° C. The molar ratio of the sodium oxide and the mixture was 1:5.

In this manner, lithium oxides $Li_ANa_BMn_xCo_yO_{2\pm\alpha}$ ($0.5 \leq A \leq 1.2$, $0 < B \leq 0.01$, $0.40 \leq x \leq 0.55$, $0.40 \leq y \leq 0.55$, $0.80x+y \leq 1.10$, and $0 \leq \alpha \leq 0.3$) that belong to the space group $P6_3mc$ or the space group Cmca and have the composition formulae shown in Table 2 were formed as the positive electrode active materials. Note that in the composition ratios of the positive electrode active materials of the inventive examples 5 to 9 shown in Table 2, the composition ratios of sodium (Na) and lithium (Li) were measured by atomic emisof quartz, and a deposit in a vessel was filtered to be washed with water. The deposit was heated for 4 hours at 200° C. and dewatered to remove water of hydration, so that $Li_{0.2}Na_{0.8}MnO_2$ was formed.

A test cell of the nonaqueous electrolyte secondary battery of FIG. 1 was fabricated using the $Li_{0.2}Na_{0.8}MnO_2$ formed in this manner as the positive electrode active material.

(c) Comparative Example 3

In the comparative example 3, first, sodium hydroxide (NaOH), lithium hydroxide monohydrate ($LiOH.H_2O$) and manganese dioxide ($MnO_2$) were weighed such that a molar ratio of sodium, lithium and manganese was 0.67:0.17:0.83. Then, the weighed compounds were added to pure water of an amount enough to completely melt the sodium hydroxide and the lithium hydroxide monohydrate therein. Then, the aqueous solution was agitated while being heated to evaporate moisture. Accordingly, dried powder of $Na_{0.67}[Li_{0.17}Mn_{0.83}]O_2$ was obtained. The dried powder was fired for 20 hours in an oxygen stream of 800° C. Then, the fired substance was promptly taken out of the furnace, and rapidly cooled. In this manner, the sodium oxide $Na_{0.67}[Li_{0.17}Mn_{0.83}]O_2$ as the precursor was formed.

Next, the sodium oxide $Na_{0.67}[Li_{0.17}Mn_{0.83}]O_2$ as the precursor was added to hexanol in which lithium bromide (LiBr) was melted at concentration of 1M, and agitated while being heated for eight hours at 180° C. to produce slurry. Then, the slurry was filtered with a filter paper, and a solid substance that remained on the filter paper was washed with methanol. The washed solid substance was subsequently dried at 80° C., so that the positive electrode active material was formed. A test cell of the nonaqueous electrolyte secondary battery of FIG. 1 was fabricated using the positive electrode active material that have been formed in this manner.

Note that in the following description, the sodium oxide $Na_{0.67}[Li_{0.17}Mn_{0.83}]O_2$ as the precursor corresponds to the comparative example 3 (I), and the positive electrode active material formed in the comparative example 3 corresponds to the comparative example 3 (II).

(d) Comparative Example 4

In the comparative example 4, the sodium oxide $Na_{0.67}[Li_{0.17}Mn_{0.83}]O_2$ of the comparative example 3 (I) was subjected to the ion exchange in the same manner as the inventive examples 5 to 9, so that the positive electrode active material was formed.

(e) Comparative Example 5

In the comparative example 5, the sodium oxide $NaMn_{0.5}Co_{0.25}Ni_{0.25}O_2$ that belongs to the space group $P6_3mc$ and/or the space group Cmca was subjected to the ion exchange in the same manner as the inventive examples 5 to 9, so that the positive electrode active material was formed.

(3) XRD Measurement (a)
The positive electrode active materials formed in the inventive examples 1 to 3 and the inventive examples 5 to 9 were measured by XRD (X-Ray Diffractometer). XRD measurement was performed using the $CuK_\alpha$ as an X-ray source in the range of the diffraction angle $2\theta=10°$ to 80°. Upper stages of FIGS. 2 to 9 show results of the XRD measurement of the positive electrode active materials of the inventive examples 1 to 3 and the inventive examples 5 to 9. Lower stages of FIGS. 2 to 9 show X-ray diffraction data of $Li_2MnO_3$ whose diffraction angle $2\theta$ has a main peak in the range from 18.0° to 19.5° and which belongs to the space group C2/m (the space group C2/c). Note that similarly to FIGS. 2 to 9, upper stages show X-ray analysis data of the oxides of the inventive examples and the comparative examples and lower stages show the X-ray diffraction data of $Li_2MnO_3$ also in FIGS. 10 to 14 described below.

Figure 10:
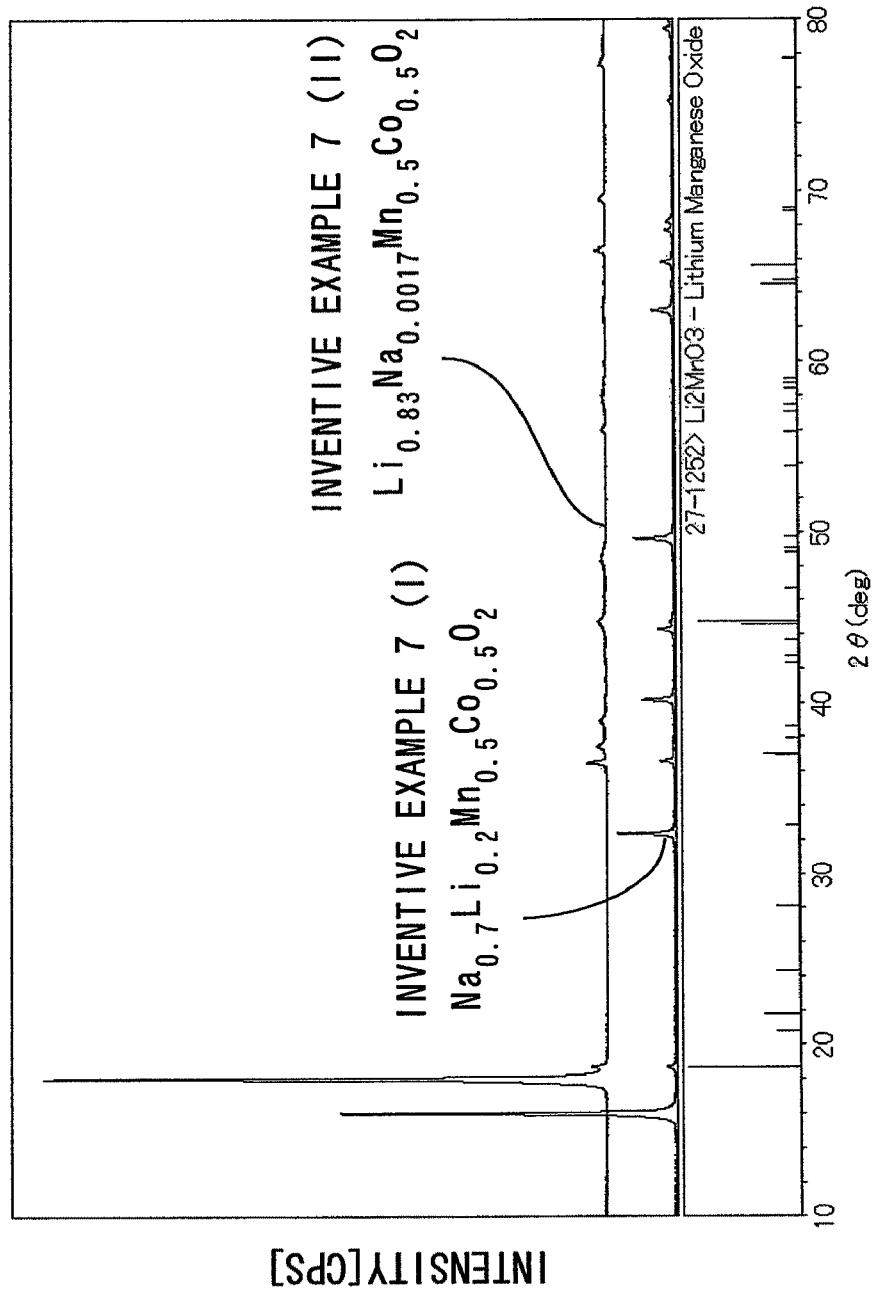
FIG. 10 A graph showing a result of the XRD measurement of a sodium oxide of an inventive example 7 (I) and a positive electrode active material of an inventive example 7 (II)

(b)
The sodium oxide $Na_{0.7}Li_{0.2}Mn_{0.5}Co_{0.5}O_2$ of the inventive example 7 (see Table 2) as the precursor was measured by the XRD. Note that the sodium oxide $Na_{0.7}Li_{0.2}Mn_{0.5}Co_{0.5}O_2$ as the precursor of the inventive example 7 corresponds to an inventive example 7 (I), and the positive electrode active material $Li_{0.83}Na_{0.0017}Mn_{0.5}Co_{0.5}O_2$ of the inventive example 7 corresponds to an inventive example 7 (II) in the following description. Results of the measurement are shown in FIG. 10. FIG. 10 shows the X-ray diffraction data of the positive electrode active material $Li_{0.83}Na_{0.0017}Mn_{0.5}Co_{0.5}O_2$ of the inventive example 7 (II) for comparison. In the upper stage of FIG. 10, the X-ray diffraction data of the positive electrode active material $Li_{0.83}Na_{0.0017}Mn_{0.5}Co_{0.5}O_2$ of the inventive example 7 (II) is shown above the X-ray diffraction data of the sodium oxide $Na_{0.7}Li_{0.2}Mn_{0.5}Co_{0.5}O_2$ of the inventive example 7 (I).

Figure 11:
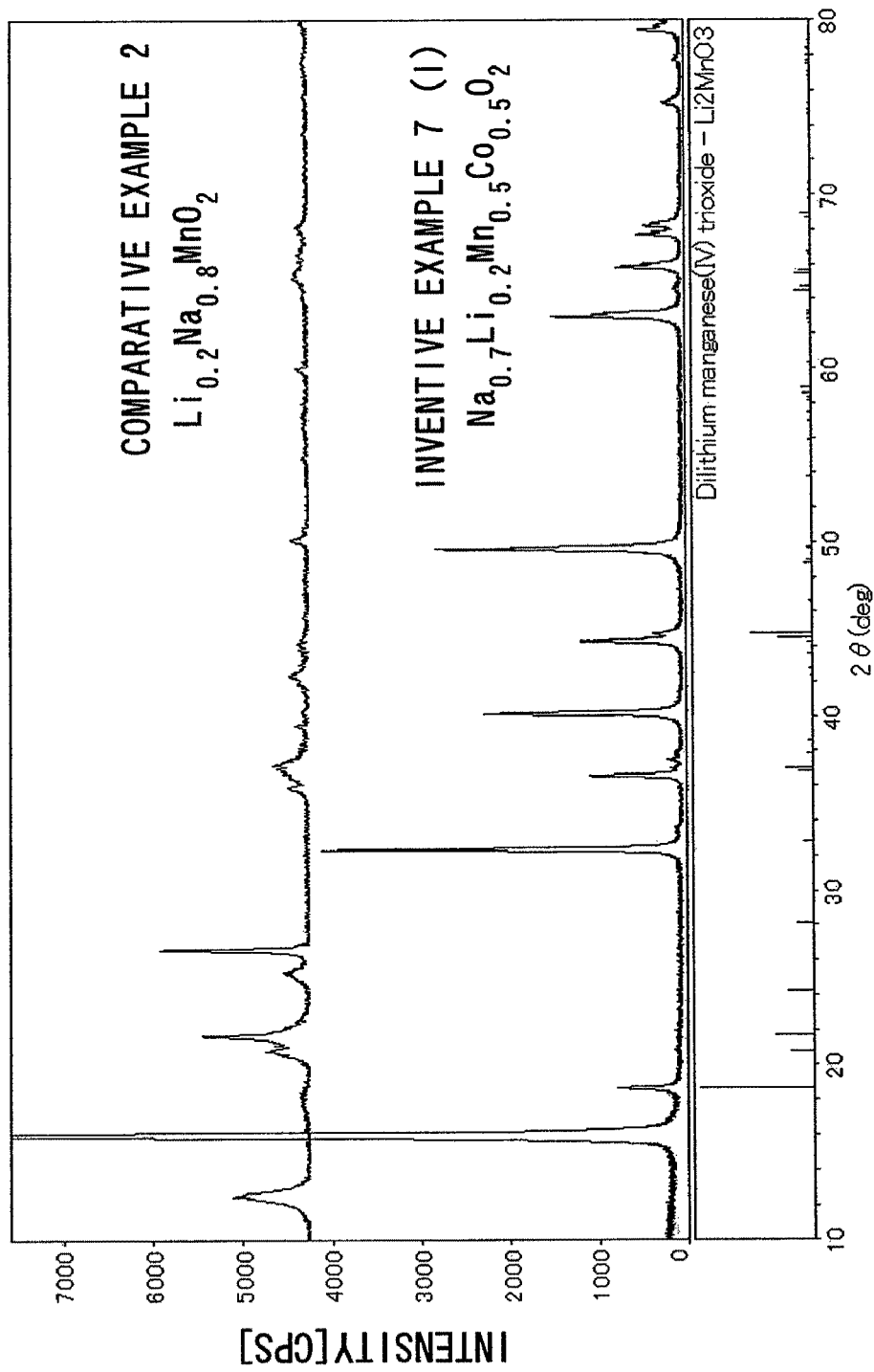
FIG. 11 A graph showing a result of the XRD measurement of sodium oxides of a comparative example 2 and the inventive example 7 (I)

(c)
The sodium oxide $Li_{0.2}Na_{0.8}MnO_2$ of the comparative example 2 was measured by the XRD. Results are shown in FIG. 11. Note that FIG. 11 shows the X-ray diffraction data of the sodium oxide $Na_{0.7}Li_{0.2}Mn_{0.5}Co_{0.5}O_2$ of the inventive example 7 (I) shown in FIG. 10 for comparison. In the upper stage of FIG. 11, the X-ray diffraction data of the sodium oxide of the comparative example 2 is shown above the X-ray diffraction data of the sodium oxide of the inventive example 7.

Figure 12:
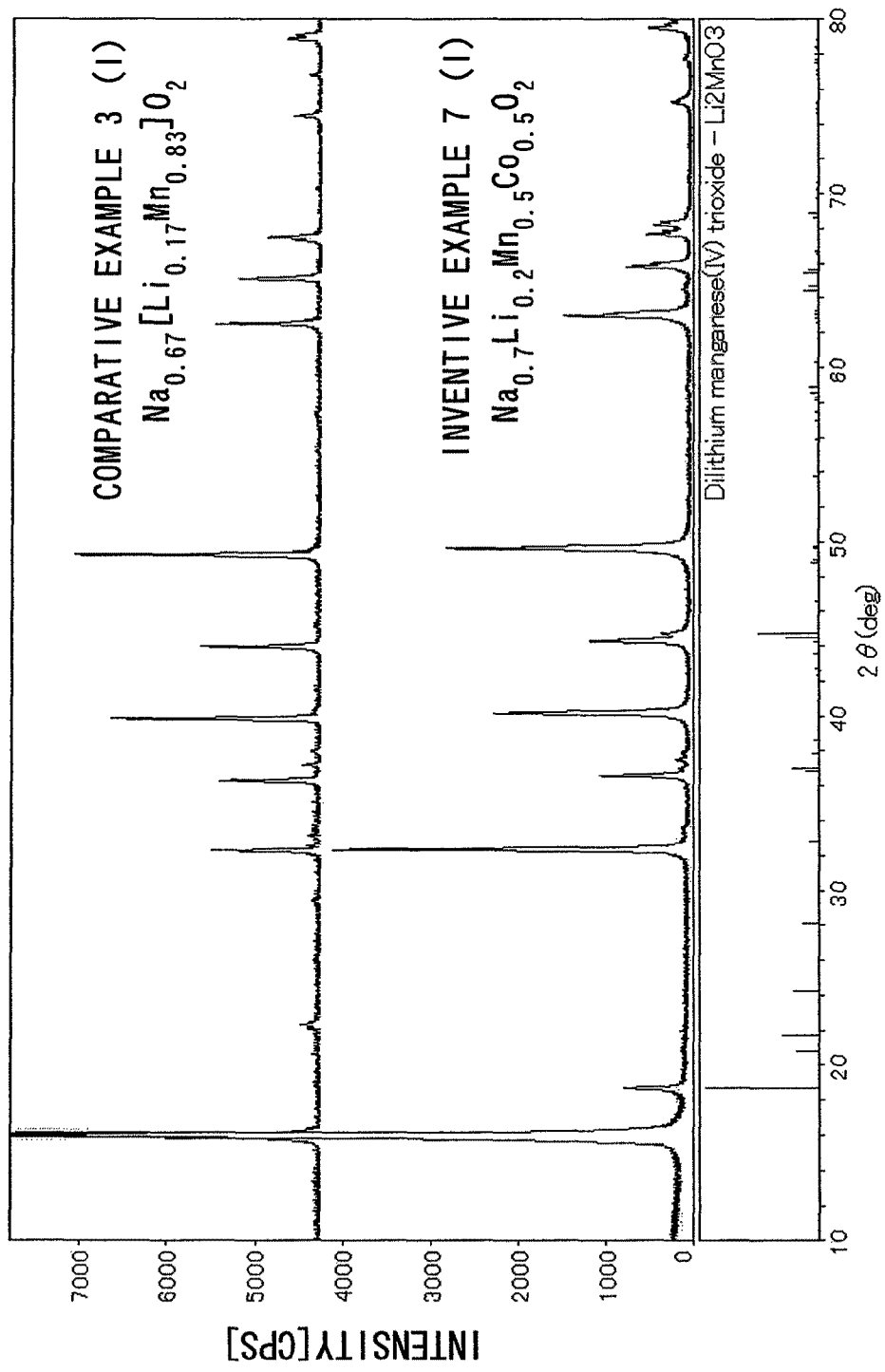
FIG. 12 A graph showing a result of the XRD measurement of sodium oxides of a comparative example 3 (I) and the inventive example 7 (I)

(d)
The sodium oxide $Na_{0.67}[Li_{0.17}Mn_{0.83}]O_2$ of the comparative example 3 (I) was measured by the XRD. Results are shown in FIG. 12. Note that FIG. 12 shows the X-ray diffraction data of the sodium oxide $Na_{0.7}Li_{0.2}Mn_{0.5}Co_{0.5}O_2$ of the inventive example 7 (I) shown in FIG. 10 for comparison. In the upper stage of FIG. 12, the X-ray diffraction data of the sodium oxide of the comparative example 3 (I) is shown above the X-ray diffraction data of the sodium oxide of the inventive example 7 (I).

Figure 13:
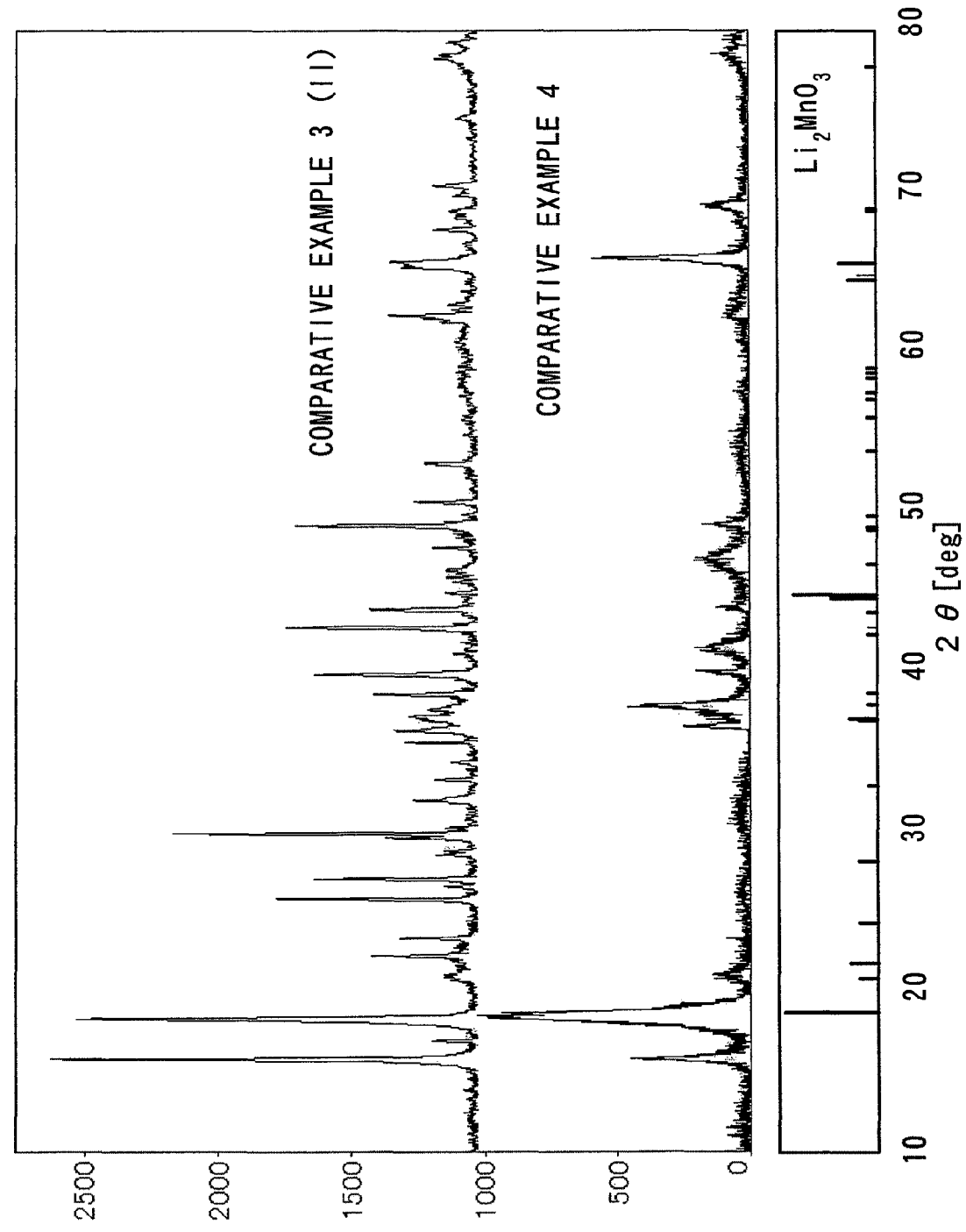
FIG. 13 A graph showing a result of the XRD measurement of positive electrode active materials of a comparative example 3 (II) and a comparative example 4

(e)
The positive electrode active material of the comparative example 3 (II) and the positive electrode active material of the comparative example 4 were measured by the XRD. Results are shown in FIG. 13. Note that in the upper stage of FIG. 13, the X-ray diffraction data of the positive electrode active material of the comparative example 3 (II) is shown above the X-ray diffraction data of the positive electrode active material of the comparative example 4.

Figure 14:
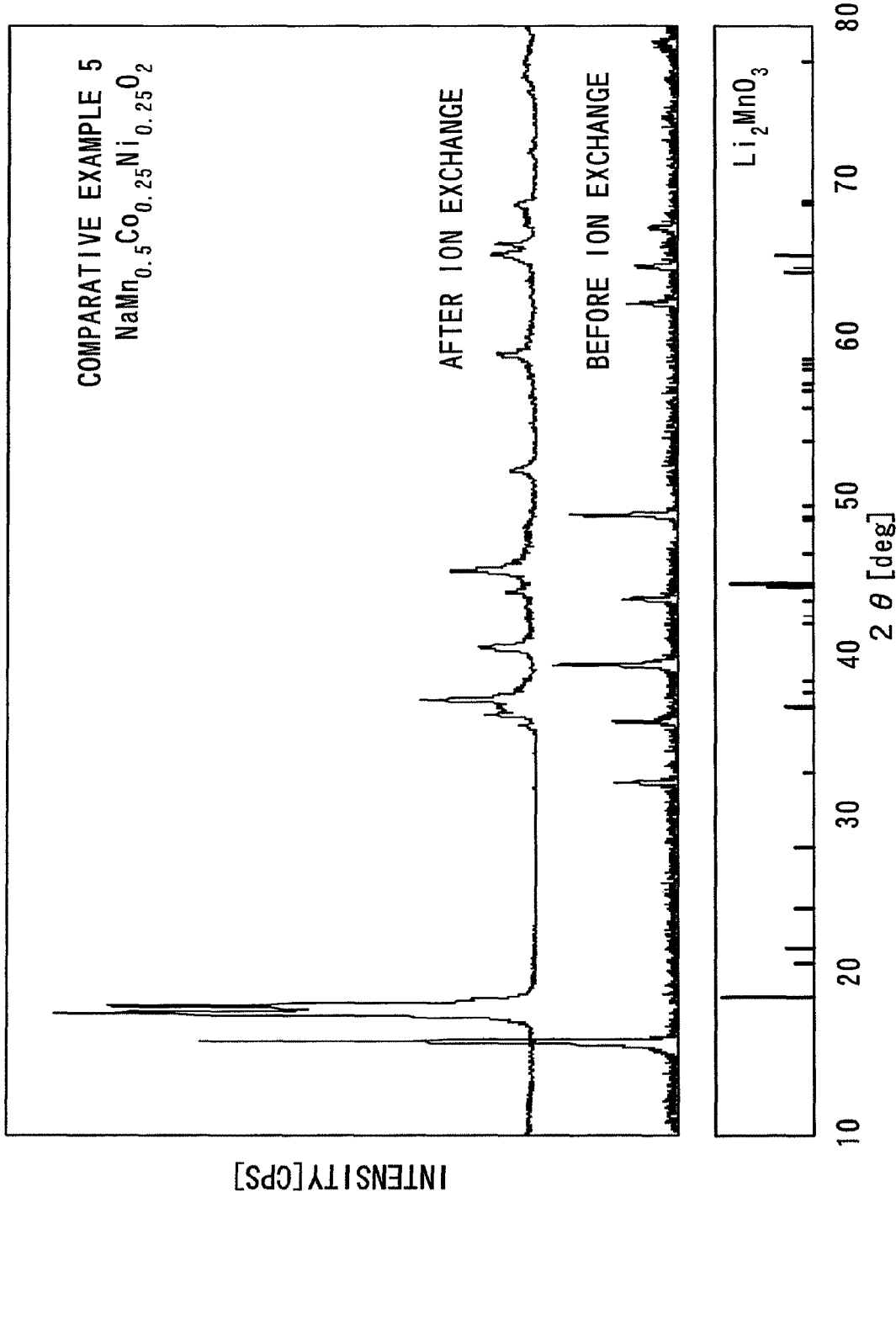
FIG. 14 A graph showing a result of the XRD measurement of a compound of a comparative example 5

(f)
The sodium oxide $NaMn_{0.5}Co_{0.25}Ni_{0.25}O_2$ before the ion exchange and the sodium oxide after the ion exchange of the comparative example 5 were measured by the XRD. Results are shown in FIG. 14. Note that in the upper stage of FIG. 14, the result of measurement of the sodium oxide after the ion exchange is shown above the result of measurement of the sodium oxide before the ion exchange.

(g) Evaluation of the Diffraction Data

In the X-ray diffraction data of the positive electrode active materials in the upper stages of FIGS. 2, 3 and 5 to 9, peaks appear in the range of the diffraction angle $2\theta$ from 18.0° to 19.5°. According to the comparison between the X-ray diffraction data of the upper stages and the X-ray diffraction data of the lower stages in FIGS. 2, 3 and 5 to 9, it is considered that the positive electrode active materials of the inventive examples 1, 2 and 5 to 9 each contain $Li_2MnO_3$ as a solid solution, a mixture or both of them. Note that the result of the XRD measurement indicates that the amount of the $Li_2MnO_3$ contained in the positive electrode active material of the inventive example 2 was less than 29 mol %.

As shown in FIG. 10, the peak appears in the range of the diffraction angle $2\theta$ from 18.0° to 19.5° also in the X-ray diffraction data of the sodium oxide $Na_{0.7}Li_{0.2}Mn_{0.5}Co_{0.5}O_2$ of the inventive example 7 (I). According to the result, it is considered that the sodium oxide $Na_{0.7}Li_{0.2}Mn_{0.5}Co_{0.5}O_2$ as the precursor contains the $Li_2MnO_3$ as a solid solution, a mixture or both of them. Although not shown, the peak appears in the range of the diffraction angle $2\theta$ from 18.0° to 19.5° also in the X-ray diffraction data of the sodium oxide (see Table 2) of the inventive examples 5, 6, 8 and 9.

As shown in FIG. 10, the main peak appears when the diffraction angle 2θ is about 16° in the X-ray diffraction data of the sodium oxide as the precursor, and the main peak appears when the diffraction angle 2θ is about 18° in the X-ray diffraction data of the lithium oxide as the positive electrode active material. Neither of waveforms of the main peaks of the sodium oxide and the lithium oxide is significantly disturbed. This is probably because the ion exchange of the sodium oxide was quantitative and uniformly proceeded in the inventive example 7. Note that these XRD measurement of the inventive examples 1 to 3, 5, 6, 8 and 9 resulted in the same.

The X-ray diffraction data of FIG. 11 indicates that the sodium oxide $Li_{0.2}Na_{0.8}MnO_2$ of the comparative example 2 has a structure that is greatly different from that of the sodium oxide $Na_{0.7}Li_{0.2}Mn_{0.5}Co_{0.5}O_2$ of the inventive example 7 (I). Specifically, the main peak appears when the diffraction angle 2θ is about 16° and the second-highest peak appears in a range of the diffraction angle 2θ from about 32° to 34° in the X-ray diffraction data of the sodium oxide of the inventive example 7 (I). Meanwhile, neither the main peak nor the second-highest peak does not appear in the diffraction angle 2θ in the X-ray diffraction data of the sodium oxide of the comparative example 2. Moreover, the peak does not appear in the range of the diffraction angle 2θ from 18.0° to 19.5° in the X-ray diffraction data of the sodium oxide of the comparative example 2.

Note that the sodium oxide of the comparative example 2 and the sodium oxide of the inventive example 7 (I) have greatly different structures. Therefore, it is considered that when the oxides are subjected to the ion exchange in the same manner, the resulted compounds after the ion exchange have completely different structures from each other.

Note that the sodium oxide is formed by hydrothermal synthesis in the comparative example 2. In this case, it is considered that crystallinity of the sodium oxide depends on solubility of sodium salt in water and a temperature at the time of the hydrothermal synthesis.

The X-ray diffraction data of FIG. 12 indicates that the sodium oxide $Na_{0.67}[Li_{0.17}Mn_{0.83}]O_2$ of the comparative example 3 (I) and the sodium oxide $Na_{0.7}Li_{0.2}Mn_{0.5}Co_{0.5}O_2$ of the inventive example 7 (I) have different structures. Specifically, while the peak appears in a range of the diffraction angle 2θ from about 22° to 24° in the X-ray diffraction data of the sodium oxide of the comparative example 3 (I), the peak does not appear in the range of the diffraction angle 2θ from about 22° to 24° in the X-ray diffraction data of the sodium oxide of the inventive example 7 (I). The sharp peak does not appear in the range of the diffraction angle 2θ from 18.0° to 19.5° in the X-ray diffraction data of the sodium oxide of the comparative example 3 (I). This is probably because part of manganese is replaced by lithium.

Furthermore, the X-ray diffraction data of FIGS. 10 and 13 indicates that the positive electrode active material of the comparative example 3 (II) (see FIG. 13) obtained through the ion exchange of the sodium oxide $Na_{0.67}[Li_{0.17}Mn_{0.83}]O_2$ of the comparative example 3 (I) has a greatly different structure from that of the positive electrode active material $Li_{0.83}Na_{0.0017}Mn_{0.5}Co_{0.5}O_2$ of the inventive example 7 (II) (see FIG. 10) obtained through the ion exchange of the sodium oxide $Na_{0.7}Li_{0.2}Mn_{0.5}Co_{0.5}O_2$ of the inventive example 7 (I). Particularly, as seen from FIGS. 12 and 13, a peak intensity of the positive electrode active material obtained through the ion exchange was significantly decreased and a half-value breadth was increased in the comparative example 4 in which the sodium oxide of the comparative example 3 (I) was subjected to the ion exchange in the same condition as the formation condition of the positive electrode active material of the inventive example 7 (II).

As shown in FIG. 13, the waveform of the X-ray diffraction data of the positive electrode active material of the comparative example 3 (II) is greatly different from the waveform of the X-ray diffraction data of the positive electrode active material of the comparative example 4. Accordingly, it is considered that the positive electrode active material of the comparative example 3 (II) and the positive electrode active material of the comparative example 4 do not have the same structures.

The waveforms of the X-ray diffraction data shown in FIG. 13 are also different from the waveform of the X-ray diffraction data of the positive electrode active material according to the present invention (the positive electrode active material of the inventive example 7 (II), for example). In general, when the plurality of sodium oxides (the precursors before the ion exchange) belong to the same space group and have the same X-ray diffraction data, the positive electrode active materials obtained through the ion exchange of the plurality of sodium oxides tend to be considered to have the same characteristics. When the structures and ratios of the transition metals in the sodium oxides being the precursors are different, however, advance mechanisms of the ion exchange reaction (substitution reaction of sodium and lithium) are also considered to be different. Accordingly, it is considered that the X-ray diffraction data of the positive electrode active material according to the present invention and the X-ray diffraction data of the positive electrode active materials of the comparative example 3 (II) and the comparative example 4 are significantly different from one another as described above.

Meanwhile, FIGS. 2 to 9 indicate that the ion exchange quantitatively proceeded in the inventive examples 1 to 9. This shows that the ion exchange can quantitatively proceed in the sodium oxides (see Tables 1 and 2) of the inventive examples 1 to 9, which are the composite oxides containing cobalt and manganese.

The X-ray diffraction data of FIGS. 10 and 14 indicates that the sodium oxide $NaMn_{0.5}Co_{0.25}Ni_{0.25}O_2$ (see FIG. 14) before the ion exchange of the comparative example 5 and the sodium oxide $Na_{0.7}Li_{0.2}Mn_{0.5}Co_{0.5}O_2$ (see FIG. 10) of the inventive example 7 (I) belong to the same space group (the space group P6$_3$mc and/or the space group Cmca). However, the X-ray diffraction data of FIGS. 10 and 14 indicates that the oxide (see FIG. 14) obtained through the ion exchange of the sodium oxide of the comparative example 5 has a different structure from that of the positive electrode active material $Li_{0.83}Na_{0.0017}Mn_{0.5}Co_{0.5}O_2$ (see FIG. 10) of the inventive example 7 (II) obtained through the ion exchange of the sodium oxide of the inventive example 7 (I).

Specifically, two high peaks appear near the diffraction angle 2θ of 18.5° in the X-ray diffraction data of the oxide obtained through the ion exchange of the sodium oxide of the comparative example 5 as shown in FIG. 14. This is probably because the sodium oxide of the comparative example 5 and the sodium oxide according to the present invention (the sodium oxide of the inventive example 7 (I), for example), have different advance mechanisms of the ion exchange reaction. This causes the positive electrode active material obtained in the comparative example 5 to have not a uniform phase but multiple phases in spite of the ion exchange in the same condition as those in the inventive examples 5 to 9.

(4) Charge-Discharge Test (a) Outline of Test

The test cells of the inventive examples 1 to 9 were charged to a charge cutoff potential of 4.5 V (vs. Li/Li$^+$) at a constant current of 1/5 It, and then discharged to a discharge cutoff potential of 2.5 V (vs. Li/Li$^+$) to measure a discharge capacity density. Similarly, the test cells of the inventive examples 1 to 9 were charged to a charge cutoff potential of 5.0 V (vs. Li/Li$^+$), and then discharged to the discharge cutoff potential of 2.5 V (vs. Li/Li$^+$) to measure the discharge capacity density. Tables 1 and 2 show results of the measurement of the discharge capacity densities.

Figure 15:
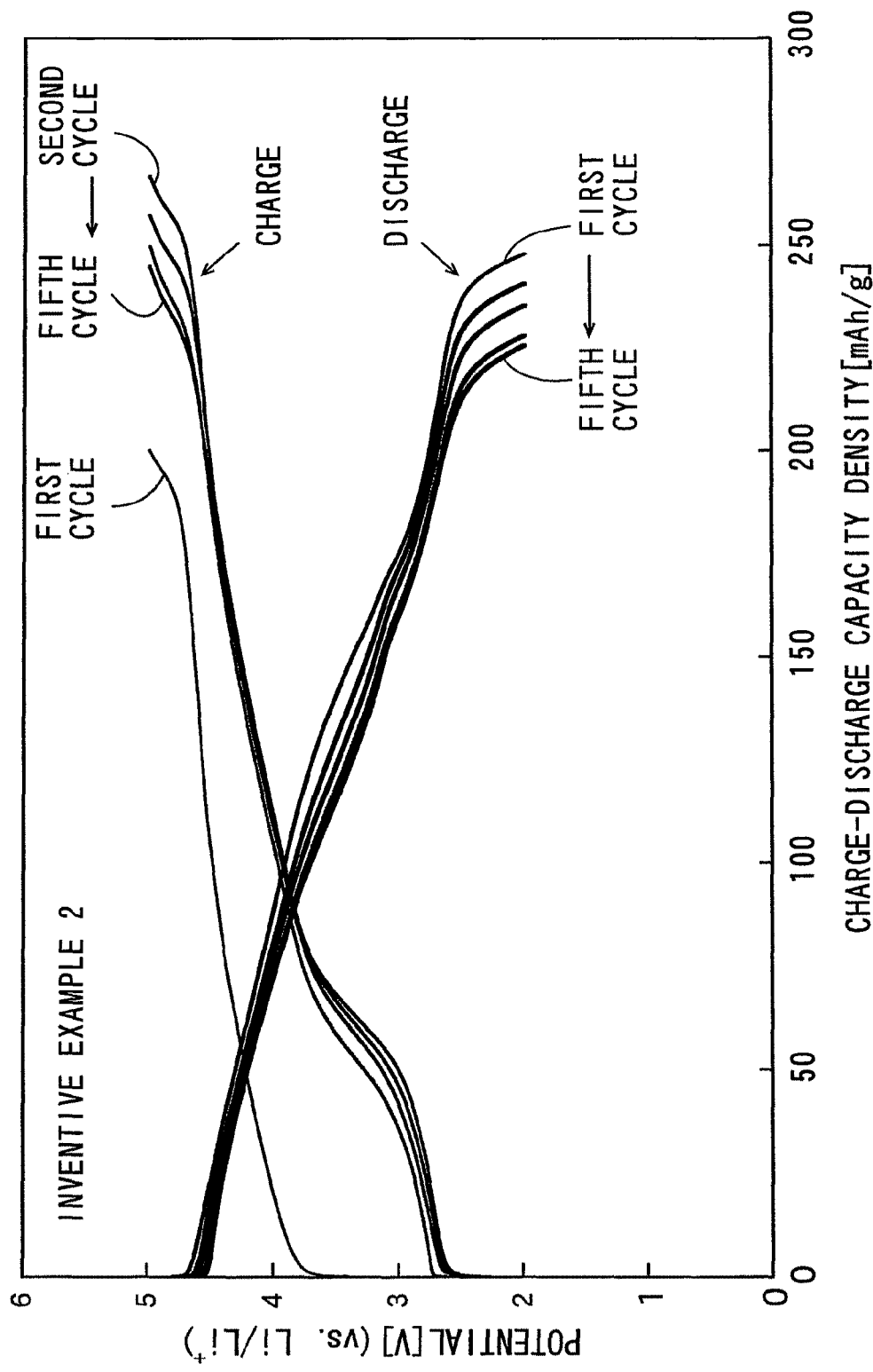
FIG. 15 A graph showing a result of a charge-discharge test

In the test cell of the inventive example 2, the charge-discharge test in a charge-discharge range of 2.0-5.0 V (vs. Li/Li$^+$) at a constant current of 1/30 It was repeated five times to measure the charge-discharge capacity density. Results are shown in FIG. 15.

Figure 16:
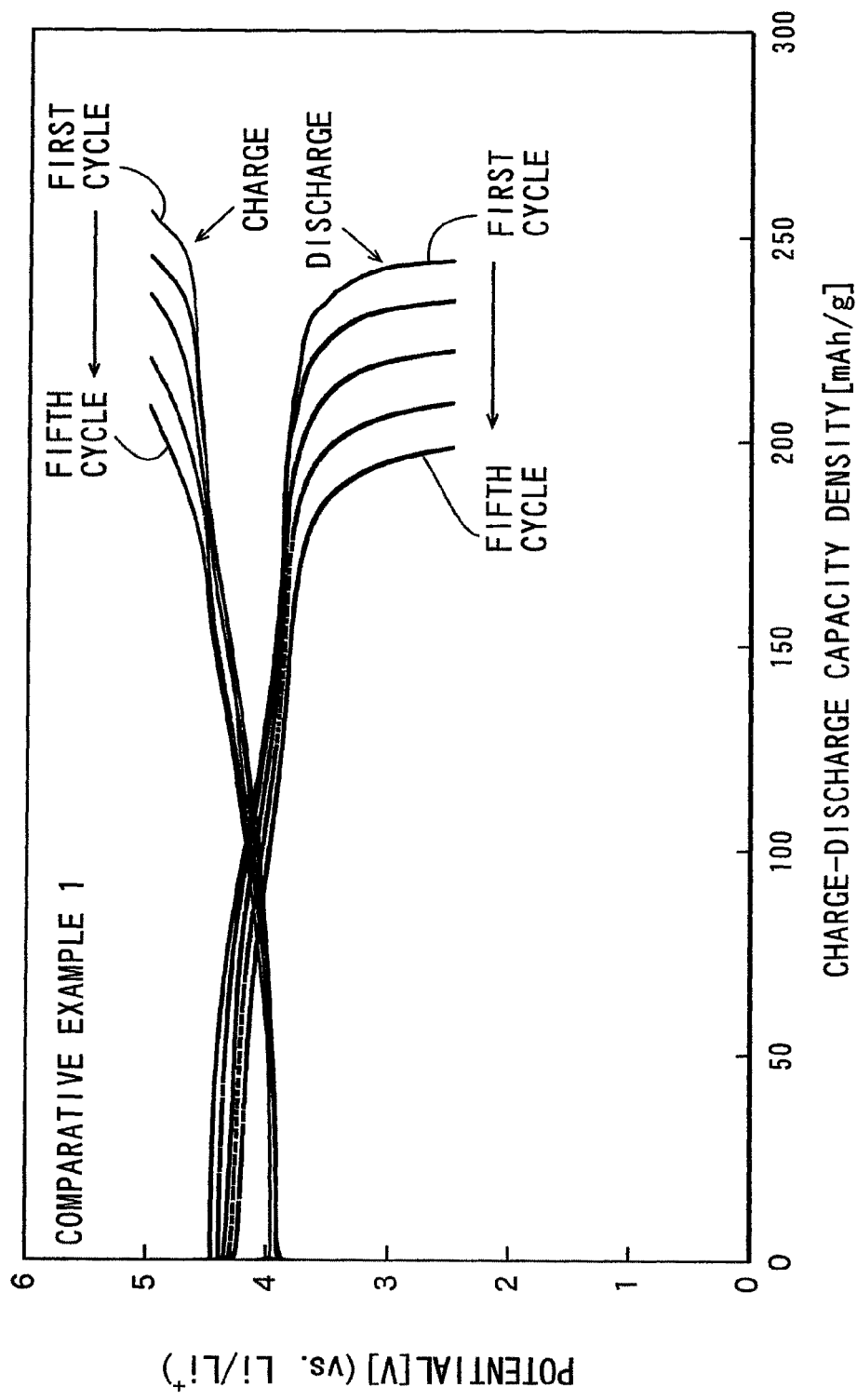
FIG. 16 A graph showing a result of the charge-discharge test

In the test cell of the comparative example 1, the charge-discharge test in the charge-discharge range of 2.5-5.0 V (vs. Li/Li$^+$) at the constant current of 1/30 It was repeated five times to measure the charge-discharge capacity density. Results are shown in FIG. 16.

Figure 17:
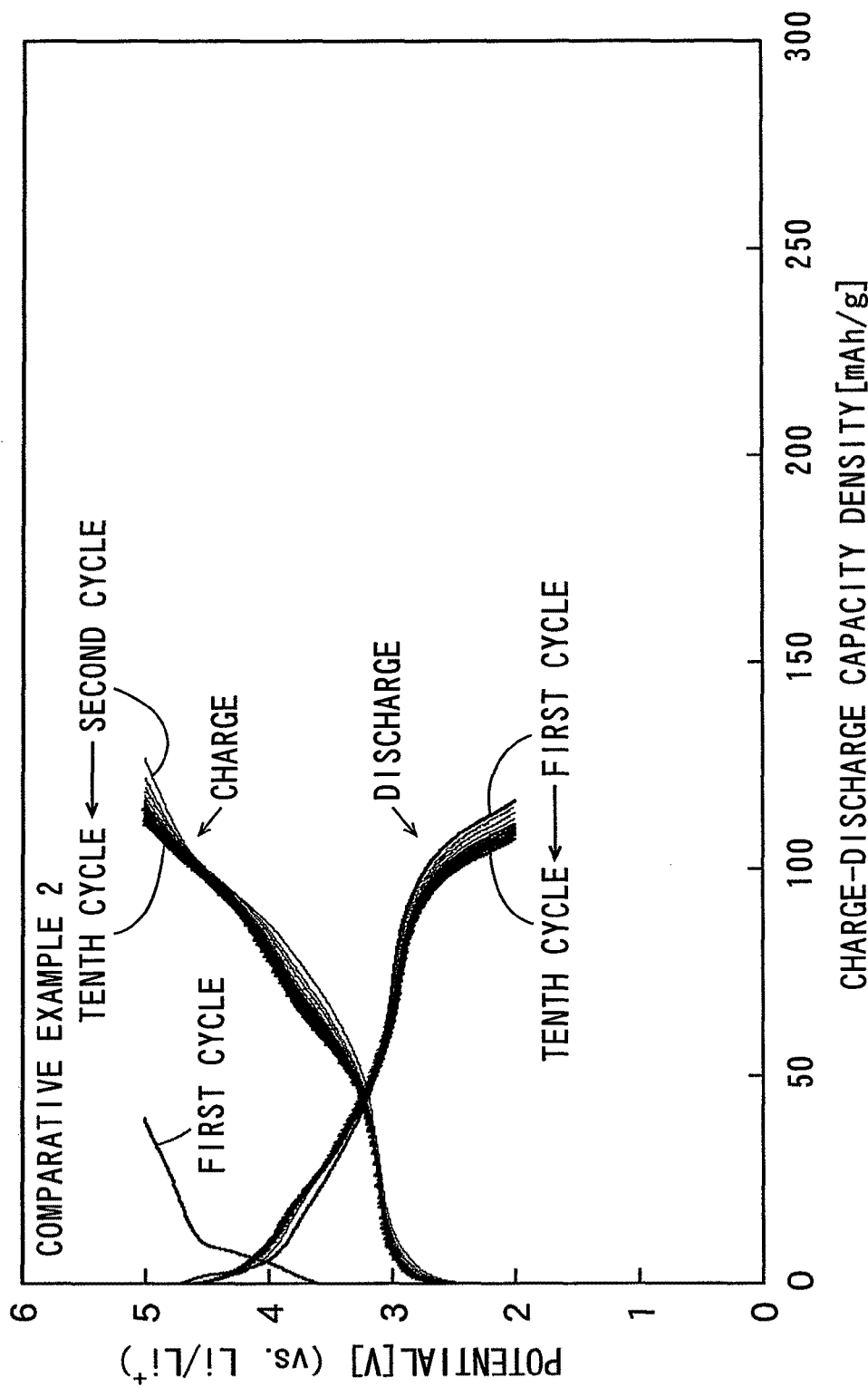
FIG. 17 A graph showing a result of the charge-discharge test

In the test cell of the comparative example 2, the charge-discharge test in the charge-discharge range of 2.0-5.0 V (vs. Li/Li$^+$) at the constant current of 1/30 It was repeated ten times to measure the charge-discharge capacity density. Results are shown in FIG. 17.

Figure 18:
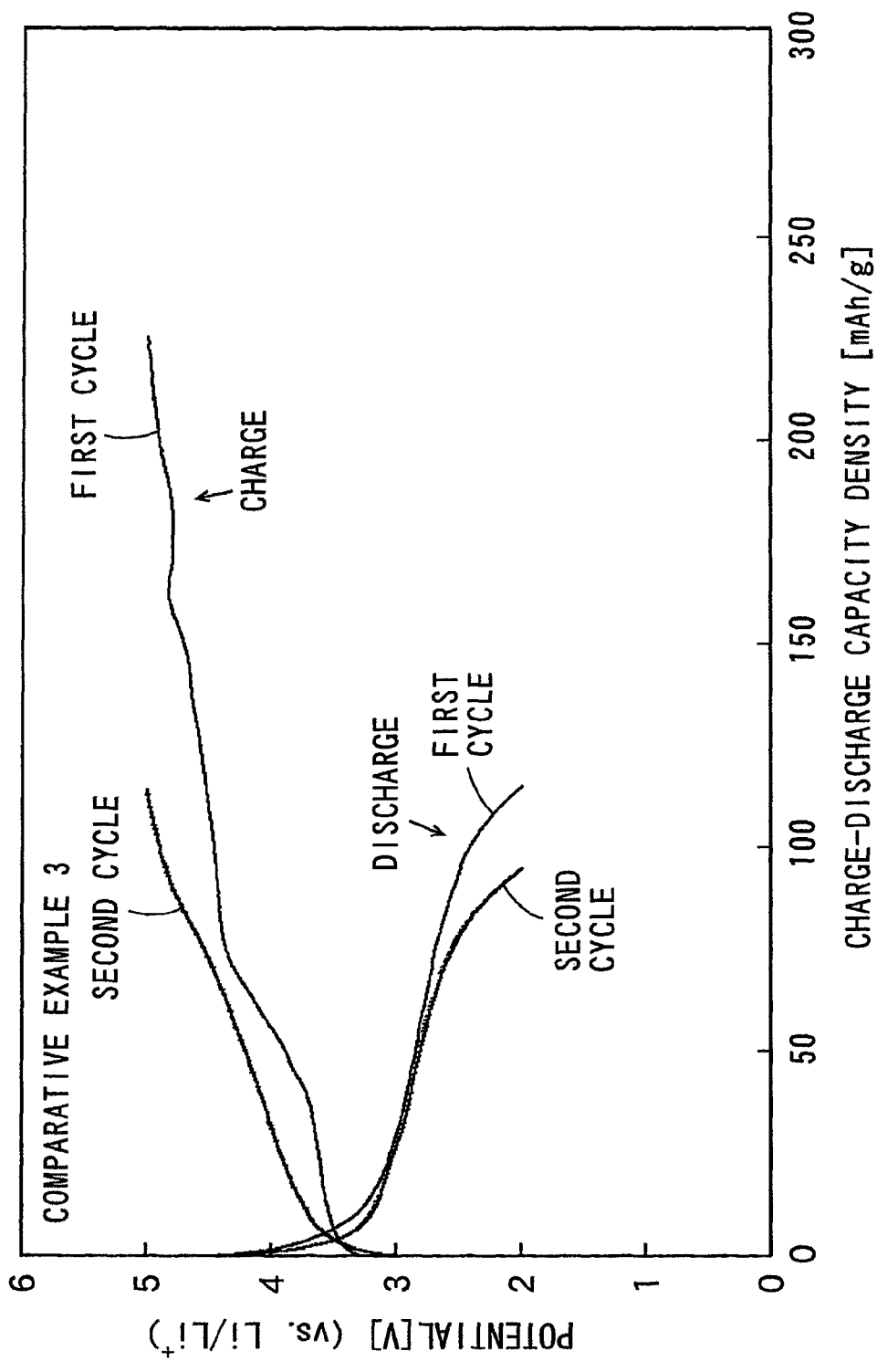
FIG. 18 A graph showing a result of the charge-discharge test

In the test cell of the comparative example 3, the charge-discharge test in the charge-discharge range of 2.0-5.0 V (vs. Li/Li$^+$) at the constant current of 1/30 It was repeated two times to measure the charge-discharge capacity density. Results are shown in FIG. 18.

Note that a current value at which a rated capacity is completely discharged in an hour is referred to as a rated current, and expressed as 1.0 C. This is expressed as 1.0 It by SI (System International) units. The charge-discharge capacity density is a value obtained by dividing a current passing through the test cell by the weight of the positive electrode active material.

(b) Evaluation

As seen from Tables 1 and 2, the discharge capacity densities in the charge-discharge range of 2.5-5.0 V were as high as not less than 176 mAh/g in the test cells of the inventive examples 1 to 9. The results indicate that the positive electrode active material contains the lithium containing layered oxide Li$_A$Na$_B$Mn$_x$Co$_y$O$_{2\pm\alpha}$ ($0.5 \leq A \leq 1.2$, $0 < B \leq 0.01$, $0.40 \leq x \leq 0.55$, $0.40 \leq y \leq 0.55$, $0.80 \leq x+y \leq 1.10$ and $0 \leq \alpha \leq 0.3$) that belongs to the space group P6$_3$mc or the space group Cmca, so that high capacity can be obtained.

Particularly, the discharge capacity density was as sufficiently high as not less than 197 mAh/g in the test cells of the inventive examples 1, 2 and 5 to 9. The results indicate that the positive electrode active material contains Li$_{1+x}$[Mn$_y$Co$_{1-y}$]O$_2$ ($0 \leq x \leq 1/3$ and $0 < y \leq 1$) whose diffraction angle 2θ has the main peak in the range from 18.0° to 19.5° and which belongs to the space group C2/m or C2/, so that higher capacity can be obtained.

In addition, the above-described result and the X-ray diffraction data shown in FIG. 10 indicate that the positive electrode active material is preferably formed by subjecting the sodium containing layered oxide Na$_A$Li$_B$MO$_{2\pm\alpha}$ ($0.5 \leq A \leq 1.1$, $0 < B \leq 0.30$ and $0 \leq \alpha \leq 0.3$) which contains lithium and whose diffraction angle 2θ has the main peak in the range from 18.0° to 19.5° to the ion exchange for lithium. Note that the M includes at least one of manganese (Mn) and cobalt (Co).

Moreover, the initial discharge capacity density was 246 mAh/g and the initial charge-discharge efficiency (=the initial discharge capacity density/the initial charge capacity density) was 124% in the test cell of the inventive example 2 as shown in FIG. 15. The discharge capacity density in the fifth cycle was 224 mAh/g, and a capacity maintenance factor (=the discharge capacity density in the fifth cycle/the initial discharge capacity density) was 91% in the test cell of the inventive example 2.

Meanwhile, the initial discharge capacity density was 242 mAh/g and the discharge capacity density in the fifth cycle was 196 mAh/g in the test cell of the comparative example 1 as shown in FIG. 16. The capacity maintenance factor of the test cell of the comparative example 1 was 81%, which is lower than that of the test cell of the inventive example 2.

In the test cell of the comparative example 2, the initial discharge capacity density was 116 mAh/g, which is lower than that of the test cell of the inventive example 2.

In the test cell of the comparative example 3, the initial discharge capacity density was 115 mAh/g, which is lower than that of the test cell of the inventive example 2.

The results indicate that the positive electrode active material contains the lithium containing layered oxide Li$_A$Na$_B$Mn$_x$Co$_y$O$_{2\pm\alpha}$ ($0.5 \leq A \leq 1.2$, $0 < B \leq 0.01$, $0.40 \leq x \leq 0.55$, $0.40 \leq y \leq 0.55$, $0.80 \leq x+y \leq 1.10$ and $0 \leq \alpha \leq 0.3$) that belongs to the space group P6$_3$mc or the space group Cmca to have high initial charge-discharge efficiency and have high capacity and good cycle performance even though the charges to the high potential and the discharges are repeated.

INDUSTRIAL APPLICABILITY

The nonaqueous electrolyte secondary battery according to the present invention can be utilized as various kinds of power supplies such as a portable power supply and an automotive power supply.

The invention claimed is:

1. A nonaqueous electrolyte secondary battery comprising:
    a positive electrode containing a positive electrode active material composed of a lithium containing oxide;
    a negative electrode; and
    a nonaqueous electrolyte, wherein
    said lithium containing oxide contains Li$_A$Na$_B$Mn$_x$Co$_y$O$_{2\pm\alpha}$ ($0.5 \leq A \leq 1.2$, $0 < B \leq 0.01$, $0.40 \leq x \leq 0.55$, $0.40 \leq y \leq 0.55$, $0.80 \leq x+y \leq 1.10$ and $0 \leq \alpha \leq 0.3$) that belongs to a space group P6$_3$mc and/or a space group Cmca.

2. The nonaqueous electrolyte secondary battery according to claim 1, wherein
    said lithium containing oxide contains a substance whose diffraction angle 2θ has a peak in a range from 18.0 degrees to 19.5 degrees in an X-ray powder crystal diffraction spectrum using CuK$_\alpha$ as an X-ray source and which belongs to a space group C2/m or a space group C2/c as a solid solution, a mixture or both of the solid solution and the mixture.

3. The nonaqueous electrolyte secondary battery according to claim 2, wherein
    said substance whose diffraction angle 2θ has the peak in the range from 18.0 degrees to 19.5 degrees is Li$_{1+x}$[Mn$_y$Co$_{1-y}$]$_{1-x}$O$_2$ ($0 \leq x \leq 1/3$ and $0 < y \leq 1$).

4. The nonaqueous electrolyte secondary battery according to claim 1, wherein a real density of said lithium containing oxide is not less than 4.4 g/cm$^3$.

5. The nonaqueous electrolyte secondary battery according to claim 1, wherein said negative electrode contains at least one selected from a group composed of lithium metal, silicon, carbon, tin, germanium, aluminum, lead, indium, gallium, a lithium containing alloy, a carbon material in which lithium is previously stored, and a silicon material in which lithium is previously stored.

6. A method of fabricating a positive electrode comprising:

forming a positive electrode active material composed of a lithium containing oxide that contains sodium by subjecting part of sodium contained in a sodium containing oxide to ion exchange for lithium, wherein said sodium containing oxide contains $Na_A Li_B MO_{2\pm\alpha}$ ($0.5 \leqq A \leqq 1.1$, $0 < B \leqq 0.3$ and $0 \leqq \alpha \leqq 0.3$), and said M includes at least one of manganese and cobalt, and said sodium containing oxide contains a substance whose diffraction angle 2θ has a peak in a range from 18.0 degrees to 19.5 degrees in an X-ray powder crystal diffraction spectrum using $CuK_\alpha$ as an X-ray source and which belongs to a space group C2/m or a space group C2/c.

* * * * *